United States Patent
Kim et al.

(10) Patent No.: US 11,630,313 B2
(45) Date of Patent: Apr. 18, 2023

(54) DISPLAY DEVICE

(71) Applicants: Young Chan Kim, Incheon (KR); Jae Ho You, Gwangmyeong-si (KR)

(72) Inventors: Young Chan Kim, Incheon (KR); Jae Ho You, Gwangmyeong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/394,773

(22) Filed: Aug. 5, 2021

(65) Prior Publication Data
US 2022/0043268 A1 Feb. 10, 2022

(30) Foreign Application Priority Data
Aug. 5, 2020 (KR) .......................... 10-2020-0097727

(51) Int. Cl.
  *G02B 27/01* (2006.01)
(52) U.S. Cl.
  CPC .. *G02B 27/0172* (2013.01); *G02B 2027/0112* (2013.01); *G02B 2027/0147* (2013.01); *G02B 2027/0178* (2013.01)
(58) Field of Classification Search
  CPC ........ G02B 27/0172; G02B 2027/0112; G02B 2027/0147; G02B 2027/0178; G02B 2027/0174; G02B 27/4205; G02B 5/1861; G02B 26/0808
  See application file for complete search history.

(56) References Cited

U.S. PATENT DOCUMENTS

| | | | | |
|---|---|---|---|---|
| 6,417,895 | B1* | 7/2002 | Tabata | G02B 27/017 348/E5.145 |
| 2007/0153402 | A1* | 7/2007 | Destain | G03B 21/208 359/742 |
| 2015/0169049 | A1* | 6/2015 | Ko | G02B 27/0179 345/156 |
| 2015/0177591 | A1* | 6/2015 | Sugiyama | G02B 27/0093 359/298 |
| 2015/0260995 | A1* | 9/2015 | Mukawa | G02B 23/14 345/8 |

(Continued)

FOREIGN PATENT DOCUMENTS

JP 2004109334 A * 4/2004

OTHER PUBLICATIONS

Erdenebat, M. U., Lim, Y. T., Kwon, K. C., Darkhanbaatar, N., & Kim, N. (2018). Waveguide-type head-mounted display system for AR application. State of the art virtual reality and augmented reality knowhow, 41.*

*Primary Examiner* — Sarah Lhymn
(74) *Attorney, Agent, or Firm* — Cantor Colburn LLP

(57) ABSTRACT

A display device includes: a display unit including a plurality of display panels which displays images of different colors, a lens unit on the display unit, an optical path controller on the lens unit, where the optical path controller generates a composite image by superimposing the images displayed by the plurality of display panels with each other, and an output unit through which the composite image is displayed. The optical path controller controls optical paths of light incident on a first surface of the optical path controller facing the lens unit and light incident on a second surface of the optical path controller, which is opposite to the first surface, and provides the composite image to the output unit.

20 Claims, 13 Drawing Sheets

(56) References Cited

U.S. PATENT DOCUMENTS

| | | | |
|---|---|---|---|
| 2017/0123747 A1 | 5/2017 | Rochford et al. | |
| 2018/0164591 A1* | 6/2018 | Saarikko | G02B 27/0172 |
| 2019/0064526 A1* | 2/2019 | Connor | G02B 6/0073 |
| 2019/0171005 A1* | 6/2019 | Lee | G02B 27/0037 |
| 2019/0392746 A1* | 12/2019 | Bohn | G02B 6/005 |
| 2020/0203324 A1* | 6/2020 | Shin | H01L 25/0753 |
| 2020/0278559 A1* | 9/2020 | Hamade | H01L 27/322 |

\* cited by examiner

DISPLAY DEVICE

This application claims priority to Korean Patent Application No. 10-2020-0097727, filed on Aug. 5, 2020, and all the benefits accruing therefrom under 35 U.S.C. § 119, the content of which in its entirety is herein incorporated by reference.

BACKGROUND

1. Field

The disclosure relates to a display device.

2. Description of the Related Art

A display device may be implemented as a head mounted display ("HMD") such as an augmented reality ("AR") display device and a virtual reality ("VR") display device. Such display devices may have a side door effect phenomenon due to a black matrix between pixels. Further, in such display devices, a high-resolution image may not be effectively displayed due to a limit in a display panel manufacturing process, a process area, and performance of an optical system.

SUMMARY

Embodiments of the disclosure provide a display device capable of improving user's visual immersion by displaying a high-resolution composite image using an output unit having a relatively small size.

According to an embodiment of the disclosure, a display device includes: a display unit including a plurality of display panels which displays images of different colors, a lens unit on the display unit, an optical path controller on the lens unit, where the optical path controller generates a composite image by superimposing the images displayed by the plurality of display panels with each other, and an output unit through which the composite image is displayed. In such an embodiment, the optical path controller controls optical paths of light incident on a first side of a first surface of the optical path controller facing the lens unit and light incident on a second side of the first surface of the optical path controller, and provides the composite image to the output unit.

In an embodiment, the display unit may include: a first display panel which displays a first image of a first color, a second display panel at one side of the first display panel, where the second display panel may display a second image having a second color different from the first color, and a third display panel at one side of the second display panel, where the third display panel may display a third image of a third color different from the first color and the second color.

In an embodiment, the optical path controller may include: a base which transmits lights of the first to third images, a first diffraction module on a second surface of the base, where the first diffraction module may reflect light of the first image, a second diffraction module on a first surface of the base opposite to the second surface, where the second diffraction module may reflect light of each of the first image and the third image toward the output unit and transmit light of the second image, and a third diffraction module on the second surface of the base, where the third diffraction module may reflect the light of the third image toward the second diffraction module.

In an embodiment, each of the first to third diffraction modules may include diffraction gratings having a predetermined pitch, and pitches of the diffraction gratings of the first to third diffraction modules may be different from each other.

In an embodiment, the first diffraction module may include diffraction gratings arranged at a first pitch, and reflect the light of the first image toward the second diffraction module, the second diffraction module may include diffraction gratings arranged at a second pitch different from the first pitch, reflect the light of each of the first image and the third image toward the output unit, and transmit the light of the second image, and the third diffraction module may include diffraction gratings arranged at a third pitch different from the first pitch and the second pitch, and reflect the light of the third image toward the second diffraction module.

In an embodiment, the optical path controller may include: a base which transmits lights of the first to third images, a first diffraction module on a first surface of the base, where the first diffraction module may change an optical path of light of the first image, a second diffraction module on a second surface of the base, which is opposite to the first surface, where the second diffraction module may change an optical path of light of each of the first and third images toward the output unit and transmit light of the second image, and a third diffraction module on the first surface of the base, where the third diffraction module may change the optical path of the light of the third image toward the second diffraction module.

In an embodiment, the optical path controller may include: a base which transmits lights of the first to third images, a first diffraction module on a second surface of the base, where the first diffraction module may transmit light of the first image and change an optical path of light of each of the second and third images toward the output unit, a second diffraction module on a first surface of the base, which is opposite to the second surface, wherein the second diffraction module may change the optical path of the light of the second image toward the first diffraction module, and a third diffraction module on the first surface of the base, where the third diffraction module may change the optical path of the light of the third image toward the first diffraction module.

In an embodiment, the optical path controller may include: a first base on the lens unit, a first diffraction module on a first surface of the first base to correspond to the first display panel, a second diffraction module on a second surface of the first base to correspond to the second display panel, a second base on the first base, a third diffraction module on a first surface of the second base to correspond to the third display panel, and a fourth diffraction module on a second surface of the second base to correspond to the output unit.

In an embodiment, the first diffraction module may change an optical path of the first image toward the second diffraction module, the second diffraction module may change the optical path of light of the first image toward the fourth diffraction module, and may transmit light of the second image toward the fourth diffraction module, the third diffraction module may change an optical path of light of the third image toward the fourth diffraction module, and the fourth diffraction module may transmit the light of the first image and the light of the second image toward the output unit, and may change the optical path of the third image toward the output unit.

In an embodiment, the optical path controller may include: a first base on the lens unit, a first diffraction module on a second surface of the first base to correspond to the first display panel, a second diffraction module on a first surface of the first base to correspond to the second display panel, a second base on the first base, a third diffraction module on a first surface of the second base to correspond to the third display panel, and a fourth diffraction module on a second surface of the second base to correspond to the output unit.

In an embodiment, the first diffraction module may reflect light of the first image toward the second diffraction module, the second diffraction module may reflect the light of the first image toward the fourth diffraction module, and may transmit light of the second image toward the fourth diffraction module, the third diffraction module may change an optical path of light of the third image toward the fourth diffraction module, and the fourth diffraction module may transmit the light of the first image and the light of the second image toward the output unit, and may change the optical path of the light of the third image toward the output unit.

In an embodiment, the optical path controller may include: a base which transmits lights of the first to third images, a first diffraction module on a first surface of the base, where the first diffraction module may change an optical path of light of the first image, a second diffraction module on a second surface of the base, which is opposite to the first surface, where the second diffraction module may change an optical path of light of each of the first and third images and transmit the light of the second image, and a third diffraction module on the second surface of the base, where the third diffraction module may change an optical path of light of the third image toward the second diffraction module. In such an embodiment, the second diffraction module may focus the optical paths of the lights of the first to third images to a specific point in front of the output unit.

In an embodiment, the display unit may include: a first display panel which displays a first image of a first color, a second display panel spaced apart from the first display panel by a predetermined distance, where the second display panel may display a second image of a second color different from the first color, and a third display panel spaced apart from the second display panel by a predetermined distance, where the third display panel may display a third image of a third color different from the first color and the second color.

In an embodiment, the optical path controller may include: a base which transmits lights of the first to third images, a first diffraction module on a first surface of the base, where the first diffraction module may change an optical path of light of the first image, a second diffraction module on a second surface of the base, which is opposite to the first surface, where the second diffraction module may change an optical path of light of each of the first and third images toward the output unit and transmit the light of the second image, and a third diffraction module on the first surface of the base, where the third diffraction module may change the optical path of the light of the third image toward the second diffraction module.

In an embodiment, the optical path controller may include: a base which transmits or totally internally reflects lights of the first to third images, a first diffraction module on a first surface of the base, where the first diffraction module may change an optical path of light of the first image, a second diffraction module on a second surface of the base, which is opposite to the first surface, where the second diffraction module may change an optical path of light of each of the first and third images toward the output unit and transmit the light of the second image, and a third diffraction module on the first surface of the base, where the third diffraction module may change the optical path of the light of the third image. In such an embodiment, the light of the first image passed through the first diffraction module and the light of the third image passed through the third diffraction module may be totally reflected inside the base and guided to the second diffraction module.

In an embodiment, the optical path controller may include: a base which transmits or totally internally reflects lights of the first to third images, a first diffraction module on a first surface of the base, where the first diffraction module may change an optical path of light of the first image, a second diffraction module on the first surface of the base, where the second diffraction module may reflect light of each of the first image and the third image toward the output unit and transmit light of the second image, and a third diffraction module on the first surface of the base, where the third diffraction module may change an optical path of the light of the third image. In such an embodiment, the light of the first image passed through the first diffraction module and the light of the third image passed through the third diffraction module may be totally reflected inside the base and guided to the second diffraction module.

In an embodiment, the display unit may include: a first display panel on a first plane, where the first display panel may display a first image of a first color, a second display panel on a second plane intersecting the first plane, where the second display panel may display a second image of a second color different from the first color, and a third display panel on a third plane intersecting the first plane and the second plane, where the third display panel may display a third image of a third color different from the first color and the second color.

In an embodiment, the optical path controller may include a base which transmits lights of the first to third images. In such an embodiment, the base may include a first surface parallel to the first plane, a second surface parallel to the second plane, a third surface parallel to the third plane, and a fourth surface facing the output unit.

In an embodiment, light of the first image may pass through the first surface to reach the fourth surface, light of the second image may pass through the second surface to reach the fourth surface, and light of the third image may pass through the third surface to reach the fourth surface.

In an embodiment, the base may further include a first diffraction module on the fourth surface of the base, where the diffraction module may focus optical paths of the lights of the first to third images to a specific point in front of the output unit.

In accordance with embodiment of the display device according to the invention, resolution of a composite image may be improved by including an optical path controller for generating a composite image by superimposing respective images of a plurality of display panels with each other. In such embodiments, a thickness of the display device may be reduced by combining a plurality of images through the optical path controller without directly stacking a plurality of display panels one on another in a thickness direction thereof. In such embodiment, even when the display device includes the output unit having a relatively small size, user's visual immersion may be improved by displaying a high-resolution composite image.

BRIEF DESCRIPTION OF THE DRAWINGS

The above and other features of the disclosure will become more apparent by describing in detail embodiments thereof with reference to the attached drawings, in which.

DETAILED DESCRIPTION

Figure 1:
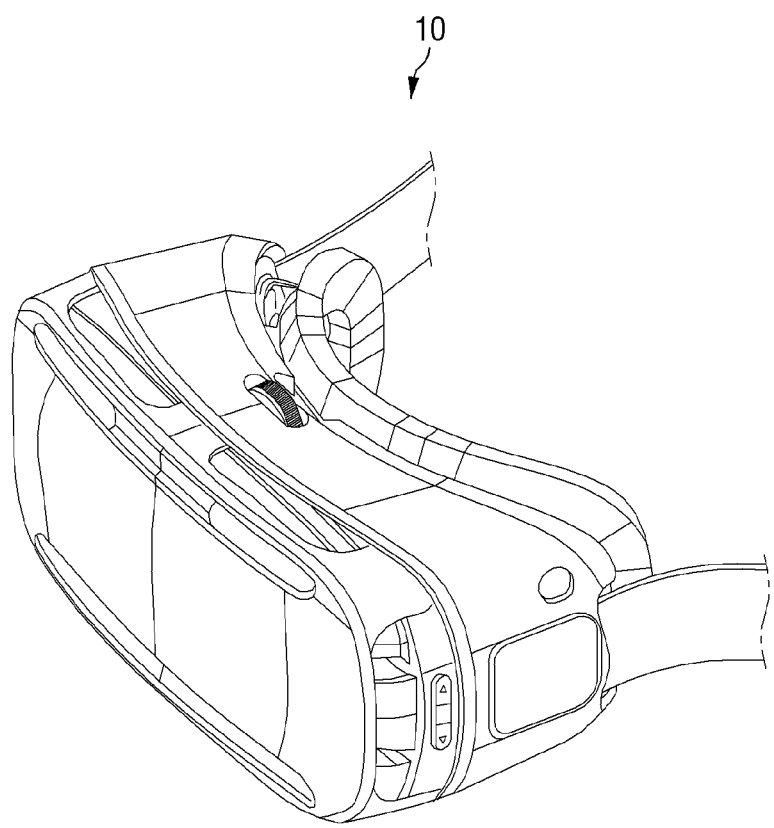
FIG. 1 is a perspective view showing a display device according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, embodiments of the invention will be described in detail with reference to the accompanying drawings.

Figure 2:
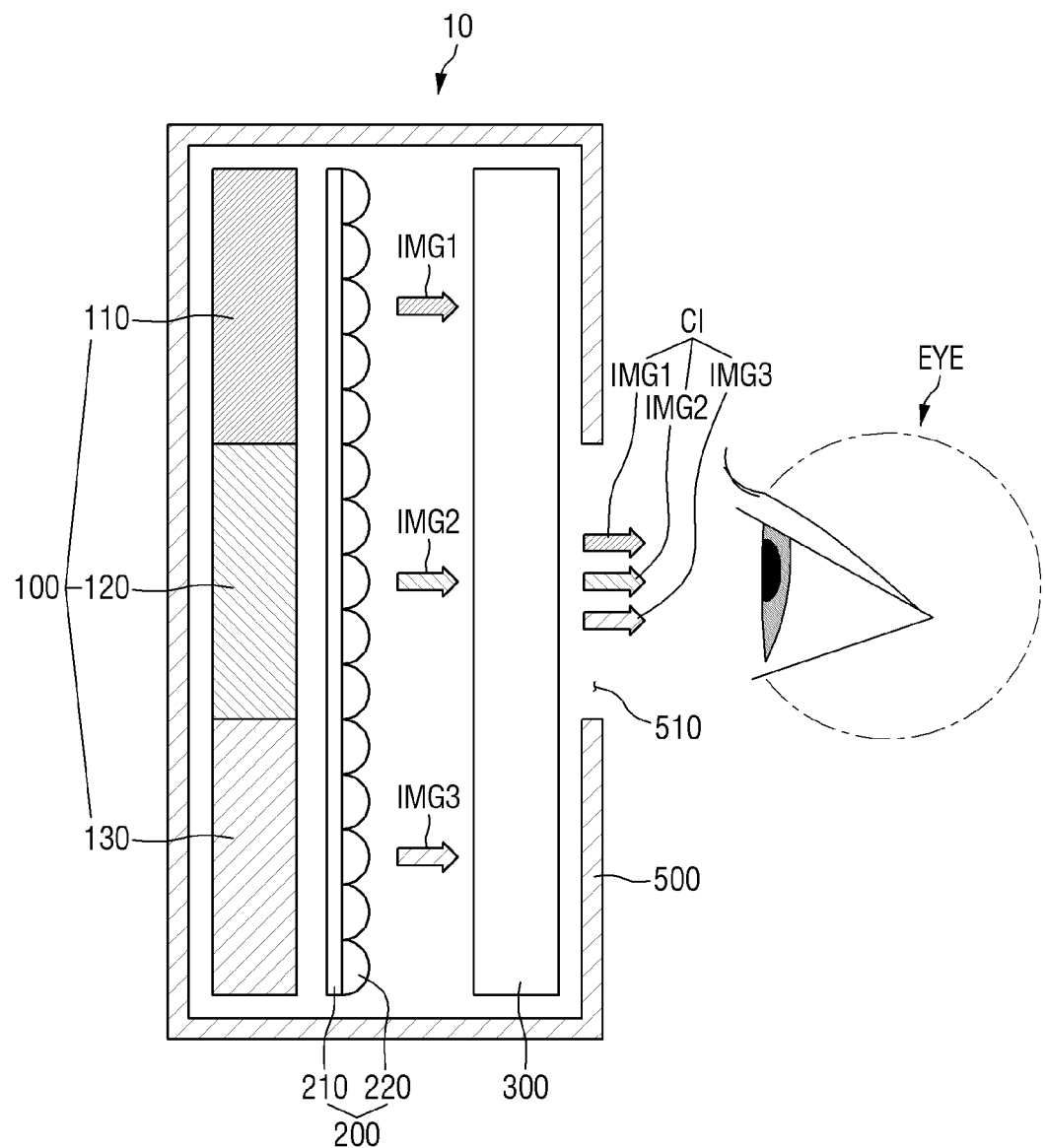
FIG. 2 shows an inside of the display device according to an embodiment.
Figure 3:
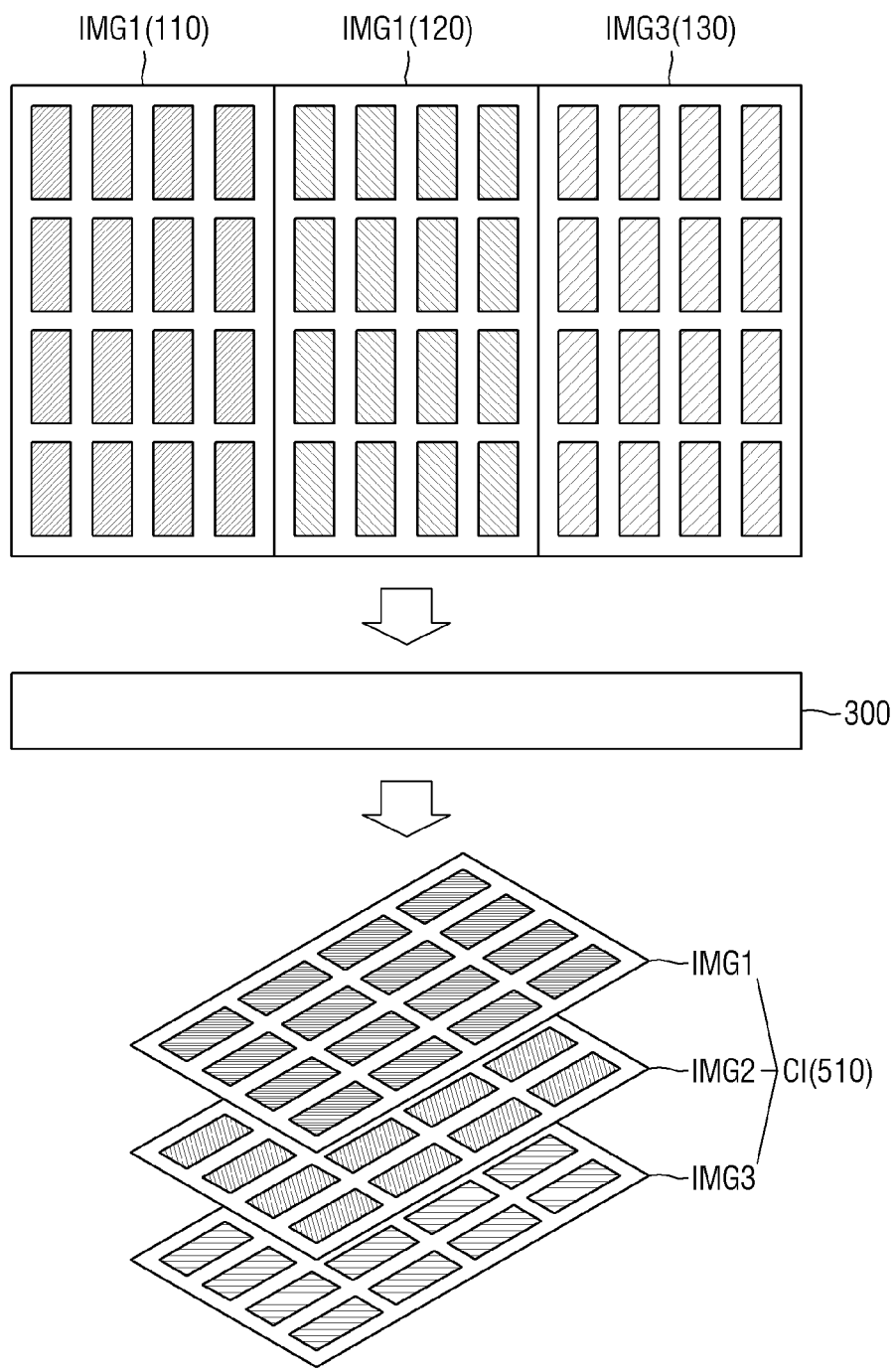
FIG. 3 shows a composite image in which a plurality of images are superimposed in the display device according to an embodiment.

FIG. 1 is a perspective view showing a display device according to an embodiment. FIG. 2 shows an inside of the display device according to an embodiment. FIG. 3 shows a composite image in which a plurality of images are superimposed with each other in the display device according to an embodiment.

Referring to FIGS. 1 to 3, an embodiment of a display device 10 may provide a virtual image to a user. In one embodiment, for example, the display device 10 may be implemented as a head mounted display ("HMD") such as an augmented reality ("AR") display device and a virtual reality ("VR") display device, and may improve user's visual immersion.

In an embodiment, as shown in FIG. 2, an embodiment of the display device 10 may include a display unit 100, a lens unit 200, an optical path controller 300, and a housing 500.

The display unit 100 may include a light emitting display panel including a light emitting element. In one embodiment, for example, the display unit 100 may be an organic light emitting display panel using an organic light emitting diode including an organic light emitting layer, a micro light emitting diode display panel using a micro light emitting diode ("LED"), a quantum dot light emitting display panel using a quantum dot light emitting diode including a quantum dot light emitting layer, or an inorganic light emitting display panel using an inorganic light emitting element including an inorganic semiconductor.

The display unit 100 may include a plurality of display panels for displaying images of different colors. Each of the plurality of display panels may include a plurality of pixels, and may display an image corresponding to a corresponding display panel. In an embodiment, as shown in FIG. 2, the display unit 100 may include first to third display panels 110, 120, and 130.

The first display panel 110 may include a plurality of pixels that emit light of a first color. The pixels of the first display panel 110 emit the light of the first color to display a first image IMG1 of the first color.

The second display panel 120 may be disposed on one side of the first display panel 110. The second display panel 120 may include a plurality of pixels that emit light of a second color. The second display panel 120 may emit the light of the second color different from the first color of the first display panel 110 to display a second image IMG2 of the second color.

The third display panel 130 may be disposed at one side of the second display panel 120. The third display panel 130 may include a plurality of pixels that emit light of a third color. The third display panel 130 may emit the light of the third color different from the first color of the first display panel 110 and the second color of the second display panel 120 to display a third image IMG3 of the third color.

In one embodiment, for example, the first color is one of red, green, and blue, the second color is another one of red, green, and blue, and the third color is the other one of red, green, and blue. However, the disclosure is not limited thereto.

The lens unit 200 may be disposed on one surface of the display unit 100. The lens unit 200 may focus the lights of the images of the display unit 100, and provide the focused lights to the optical path controller 300. In one embodiment, for example, the lens unit 200 may be attached to one surface of the display unit 100 through an adhesive member. In one alternative embodiment, for example, the lens unit 200 may be disposed on one surface of the display unit 100 while being spaced apart from the display unit 100 by a predetermined distance. Here, a distance between the lens unit 200 and the display unit 100 may be determined by various conditions of the display unit 100, the lens unit 200, and the optical path controller 300.

In one embodiment, for example, in the lens unit 200, a plurality of lenses 220 may be implemented as a lenticular lens sheet. In one alternative embodiment, for example, the lens unit 200 may be implemented as a liquid crystal lens that forms lenses by controlling liquid crystals of a liquid crystal layer. In an embodiment where the lens unit 200 is implemented as the lenticular lens sheet, the lens unit 200 may include a lens base 210 and a plurality of lenses 220.

The lens base 210 may be disposed on one surface of the display unit 100. In one embodiment, for example, one surface of the lens base 210 facing the display unit 100 and an opposing surface of the lens base 210 opposite to the one surface of the lens base 210 may be parallel to each other. The lens base 210 may directly transmit the lights incident from the display unit 100. The directions of the lights passing through the one surface of the lens base 210 may be the same as the directions of the lights passing through the opposing surface of the lens base 210. The lens base 210 may be integrally formed with the plurality of lenses 220 as a single unitary unit, but the disclosure is not limited thereto.

The plurality of lenses 220 may be arranged on the lens base 210 and may change the directions of the lights incident from the display unit 100. The lights incident from the display unit 100 may pass through the lens base 210 and reach the plurality of lenses 220.

The plurality of lenses 220 may be integrally formed with the lens base 210 as a single unitary unit. In one embodiment, for example, the plurality of lenses 220 may be embossed on a top surface of the lens base 210. The plurality of lenses 220 may be half-cylindrical lenses, but are not limited thereto. In one alternative embodiment, for example, the plurality of lenses 220 may be implemented as a Fresnel lens. In another alternative embodiment, for example, the plurality of lenses 220 may be manufactured separately from the lens base 210 and then attached onto the lens base 210.

The optical path controller 300 may be disposed to face the lens unit 200 and may generate a composite image CI by superimposing images of a plurality of display panels with each other. The optical path controller 300 may generate a single composite image CI by superimposing the first image IMG1 of the first display panel 110, the second image IMG2 of the second display panel 120, and the third image IMG3 of the third display panel 130 with each other.

The optical path controller 300 may diffract the lights of the images incident through the display unit 100 and the lens unit 200. In one embodiment, for example, the optical path controller 300 may transmit or reflect light having a specific wavelength. An optical path of the light passing through the optical path controller 300 may be maintained or may be changed by a predetermined angle. In an embodiment, the optical path controller 300 may totally internally reflect the light incident at the predetermined angle. Therefore, the optical path controller 300 may control the optical paths of the images of the plurality of display panels arranged at different locations to generate the composite image CI by superimposing the plurality of images with each other.

In one embodiment, for example, the first to third display panels 110 to 130 may be sequentially arranged while facing the optical path controller 300. In such an embodiment, the first display panel 110 may be disposed at an upper portion of the display unit 100, the second display panel 120 may be disposed at an intermediate portion of the display unit 100, and the third display panel 130 may be disposed at a lower portion of the display unit 100. In such an embodiment, the first image IMG1 of the first display panel 110 may be incident on an upper portion of one surface of the optical path controller 300, the second image IMG2 of the second display panel 120 may be incident on an intermediate portion of the one surface of the optical path controller 300, and the third image IMG3 of the third display panel 130 may be incident on a lower portion of the one surface of the optical path controller 300. The optical path controller 300 may control optical paths of light incident on a first side of a first surface of the optical path controller 300 facing the lens unit 200 and light incident on a second side of the first surface of the optical path controller 300, and may provide the composite image to the output unit 510. The optical path controller 300 may control the optical paths of the first to third images IMG1 to IMG3 incident on different locations to provide the composite image CI to an output unit 510.

In an embodiment, as shown in FIGS. 2 and 3, the composite image CI may be generated by combining the first to third images IMG1 to IMG3. When the display device 10 includes the first to third display panels 110 to 130, one pixel of the composite image CI may be formed by combining one pixel of the first display panel 110, one pixel of the second display panel 120, and one pixel of the third display panel 130. In one embodiment, for example, the composite image CI may display, using one sub-pixel, a color that may be displayed by a unit pixel including a first sub-pixel that displays a first color, a second sub-pixel that displays a second color, and a third sub-pixel that displays a third color. Therefore, the display device 10 may display the composite image CI having a same resolution as the resolutions of the first to third display panels 110 to 130. A thickness of the display device 10 may be reduced by combining the first to third images IMG1 to IMG3 through the optical path controller 300 without directly stacking the first to third display panels 110 to 130 one on another in a thickness direction thereof. Even when the display device 10 includes the output unit 510 having a relatively small size, user's visual immersion may be improved by displaying the high-resolution composite image CI.

The housing 500 may form an external appearance of the display device 10 and may accommodate the display unit 100, the lens unit 200, and the optical path controller 300 therein. The housing 500 may surround the display device 10 except the output unit 510.

The output unit 510 may be disposed or defined to overlap one surface of the optical path controller 300 to display the composite image CI. User's eyes EYE may view the composite image CI through the output unit 510. In one embodiment, for example, the output unit 510 may include an optical lens to adjust a focal point of the composite image CI. In one alternative embodiment, for example, the optical path controller 300 may control the focal point of the composite image CI. In such an embodiment, the output unit 510 may not include a separate optical lens.

Figure 4:
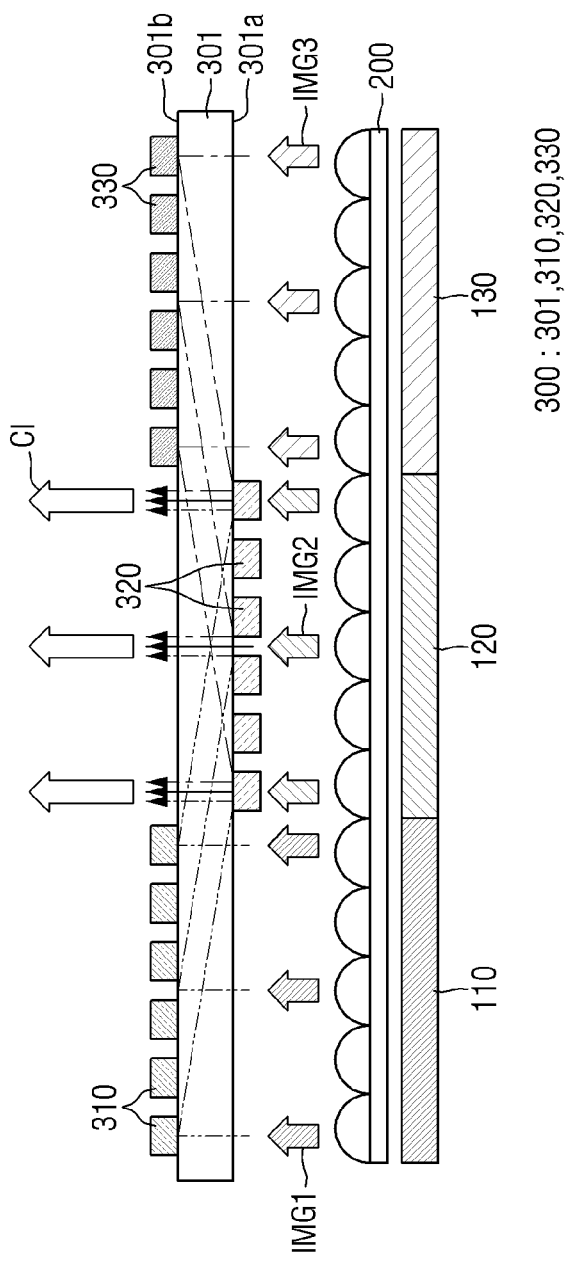
FIG. 4 shows a process of generating a composite image in the display device according to an embodiment.

FIG. 4 shows a process of generating a composite image in the display device according to an embodiment.

Referring to FIG. 4, an embodiment of the display device 10 may include the display unit 100, the lens unit 200, and the optical path controller 300.

The display unit 100 may include a plurality of display panels for displaying images of different colors. Each of the plurality of display panels may include a plurality of pixels, and may display an image of a predetermined color. The display unit 100 may include first to third display panels 110, 120, and 130.

The first display panel 110 may include a plurality of pixels that emit light of a first color. The pixels of the first display panel 110 may emit the light of the first color to display a first image IMG1 of the first color.

The second display panel 120 may be disposed at one side of the first display panel 110. The second display panel 120 may include a plurality of pixels that emit light of a second color. The second display panel 120 may emit the light of the second color different from the first color of the first display panel 110 to display a second image IMG2 of the second color.

The third display panel 130 may be disposed at one side of the second display panel 120. The third display panel 130 may include a plurality of pixels that emit light of a third color. The third display panel 130 may emit the light of the third color different from the first color of the first display panel 110 and the second color of the second display panel 120 to display a third image IMG3 of the third color.

In one embodiment, for example, the first color is one of red, green, and blue, the second color is another one of red, green, and blue, and the third color is the other one of red, green, and blue. However, the disclosure is not limited thereto.

The lens unit 200 may be disposed on one surface of the display unit 100. The lens unit 200 may focus the lights of the images of the display unit 100, and provide the focused lights to the optical path controller 300.

The optical path controller 300 may be disposed to face the lens unit 200 and may generate a composite image CI by superimposing the images of the first to third display panels 110 to 130 with each other. The optical path controller 300 may include a base 301, a first diffraction module 310, a second diffraction module 320, and a third diffraction module 330.

The base 301 may transmit light incident thereon from the display unit 100. One surface (or a first surface) 301a of the base 301 facing the lens unit 200 and the opposing surface 301b of the base 301 facing the output unit 510 may be parallel to each other. The direction of the light passing through the one surface 301a of the base 301 may be the same as the direction of the light incident on the opposing surface (or a second surface) 301b of the base 301 through the base 301. The base 301 may support the first to third diffraction modules 310 to 330.

The first diffraction module 310 may be disposed on the opposing surface 301b of the base 301 to correspond to the first display panel 110. The first diffraction module 310 may reflect light of the first image IMG1 of the first display panel 110 toward the second diffraction module 320. The first diffraction module 310 may include diffraction gratings arranged at a first pitch. In one embodiment, for example, the diffraction gratings of the first diffraction module 310 are arranged at the first pitch corresponding to a light wavelength of the first image IMG1, such that the light of the first image IMG1 is reflected by the first diffraction module 310 toward the second diffraction module 320.

In one alternative embodiment, for example, the first diffraction module 310 may include diffraction gratings arranged at the first pitch and having a first depth (or a groove depth). The diffraction gratings of the first diffraction module 310 have the first depth and are arranged at the first pitch corresponding to the light wavelength of the first image IMG1, such that the light of the first image IMG1 is reflected by the first diffraction module 310 toward the second diffraction module 320.

A refractive index of the first diffraction module 310 may be substantially the same as a refractive index of the base 301.

The second diffraction module 320 may be disposed on the one surface 301a of the base 301 to correspond to the second display panel 120. The second diffraction module 320 may transmit light of the second image IMG2 of the second display panel 120 toward the output unit 510. The second diffraction module 320 may include diffraction gratings arranged at a second pitch. In such an embodiment, the second pitch of the second diffraction module 320 may be different from the first pitch of the first diffraction module 310. The diffraction gratings of the second diffraction module 320 are arranged at the second pitch that does not affect a light wavelength of the second image IMG2, so that the second image IMG2 may pass through the second diffraction module 320 and proceed to the output unit 510.

The second diffraction module 320 may reflect the light incident from the first diffraction module 310 toward the output unit 510. The second diffraction module 320 may reflect light incident from the third diffraction module 330 toward the output unit 510.

In one alternative embodiment, for example, the second diffraction module 320 may include the diffraction gratings arranged at the second pitch and having a second depth.

In such an embodiment, the second depth of the second diffraction module 320 may be different from the first depth of the first diffraction module 310. The diffraction gratings of the second diffraction module 320 have the second depth and are arranged at the second pitch that does not affect a light wavelength of the second image IMG2, such that the light of the second image IMG2 is transmitted through the second diffraction module 320 toward the output unit 510 and the light of the first image IMG1 and the light of the third image IMG3 are reflected by the second diffraction module 320 toward the output unit 510.

A refractive index of the second diffraction module 320 may be substantially the same as the refractive index of the base 301.

The third diffraction module 330 may be disposed on the opposing surface 301b of the base 301 to correspond to the third display panel 130. The third diffraction module 330 may reflect the light of the third image IMG3 of the third display panel 130 toward the second diffraction module 320. The third diffraction module 330 may include diffraction gratings arranged at a third pitch. In such an embodiment, the third pitch of the third diffraction module 330 may be different from the first pitch of the first diffraction module 310 and the second pitch of the second diffraction module 320. In one embodiment, for example, the diffraction gratings of the third diffraction module 330 are arranged at the third pitch corresponding to a light wavelength of the third image IMG3, such that the light of the third image IMG3 is reflected by the third diffraction module 330 toward the second diffraction module 320.

In one alternative embodiment, for example, the third diffraction module 330 may include diffraction gratings arranged at the third pitch and having a third depth. In such an embodiment, the third depth of the third diffraction module 330 may be different from the first depth of the first diffraction module 310 and the second depth of the second diffraction module 320. The diffraction gratings of the third diffraction module 330 have the third depth and are arranged at the third pitch corresponding to the light wavelength of the third image IMG3, such that the light of the third image IMG3 is reflected by the third diffraction module 330 toward the second diffraction module 320.

A refractive index of the third diffraction module 330 may be substantially the same as the refractive index of the base 301.

The output unit 510 may be arranged on the opposing surface 301b of the base 301 to correspond to the second diffraction module 320. The composite image CI may include the light of the first image IMG1 and the light of the third image IMG3 that are reflected by the second diffraction module 320, and the light of the second image IMG2 passed through the second diffraction module 320. Therefore, the display device 10 may display the composite image CI having the same resolution as the resolutions of the first to third display panels 110 to 130. A thickness of the display device 10 may be reduced by combining the first to third images IMG1 to IMG3 through the optical path controller 300 without directly stacking the first to third display panels 110 to 130 one on another in a thickness direction thereof. In such an embodiment, even when the display device 10 includes the output unit 510 having a relatively small size, user's visual immersion may be improved by displaying the high-resolution composite image CI.

Figure 5:
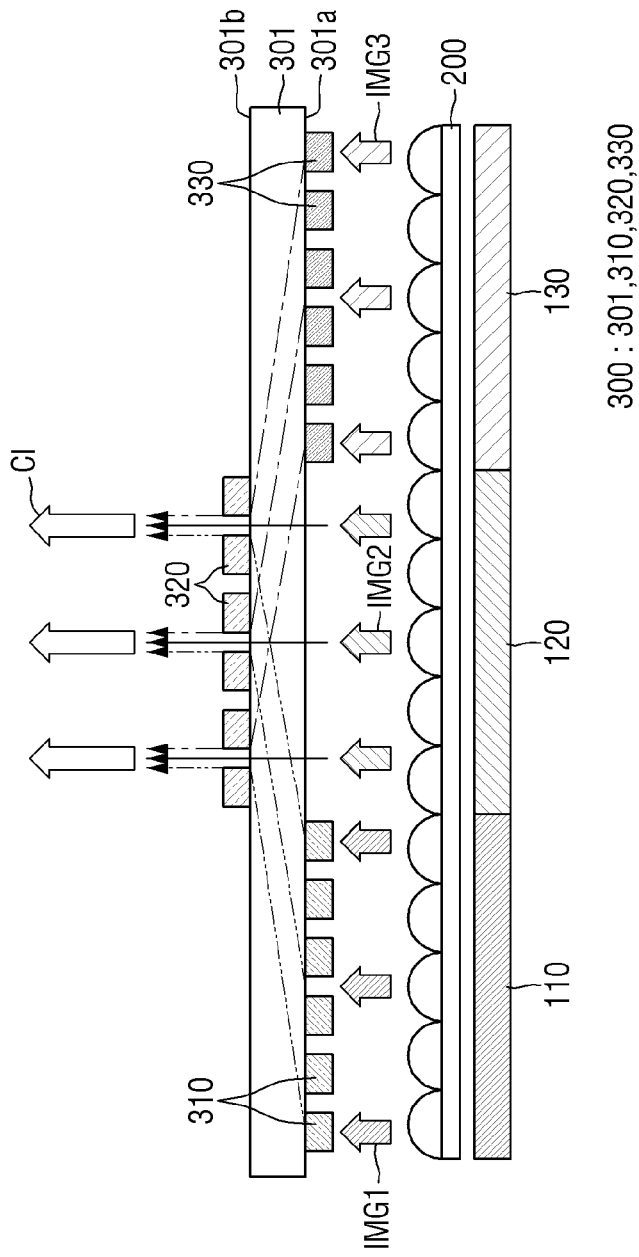
FIG. 5 shows a process of generating a composite image in a display device according to an alternative embodiment.

FIG. 5 shows a process of generating a composite image in a display device according to an alternative embodiment. The display device of FIG. 5 is substantially the same as the display device of FIG. 4 except for the optical path controller 300. The same or like elements shown in FIG. 5 have been labeled with the same reference characters as used above to describe the embodiment of the display device described above, and any repetitive detailed description thereof will hereinafter be omitted or simplified.

Referring to FIG. 5, in an embodiment, the optical path controller 300 may be disposed to face the lens unit 200 and may generate a composite image CI by superimposing images of the first to third display panels 110 to 130 with each other. The optical path controller 300 may include a base 301, a first diffraction module 310, a second diffraction module 320, and a third diffraction module 330.

The first diffraction module 310 may be disposed on one surface 301a of the base 301 to correspond to the first display panel 110. The first diffraction module 310 may change an optical path of the first image IMG1 of the first display panel 110 toward the second diffraction module 320. The first diffraction module 310 may include diffraction gratings arranged at a first pitch. In one embodiment, for example, the diffraction gratings of the first diffraction module 310 are arranged at the first pitch corresponding to a light wavelength of the first image IMG1, such that the optical path of the first image IMG1 is changed by the first diffraction module 310 toward the second diffraction module 320.

The second diffraction module 320 may be disposed on the opposing surface 301b of the base 301 to correspond to the second display panel 120. The second diffraction module 320 may transmit the light of the second image IMG2 of the second display panel 120 toward the output unit 510. The second diffraction module 320 may include diffraction gratings arranged at a second pitch. In such an embodiment, the second pitch of the second diffraction module 320 may be different from the first pitch of the first diffraction module 310.

The second diffraction module 320 may change the optical path of the light incident from the first diffraction module 310 toward the output unit 510. The second diffraction module 320 may change an optical path of light incident from the third diffraction module 330 toward the output unit 510.

In one alternative embodiment, for example, the second diffraction module 320 may include diffraction gratings arranged at a second pitch and having a second depth. In such an embodiment, the second depth of the second diffraction module 320 may be different from the first depth of the first diffraction module 310. The diffraction gratings of the second diffraction module 320 have a second depth and are arranged at the second pitch that does not affect a light wavelength of the second image IMG2, such that the light of the second image IMG2 is transmitted through the second diffraction module 320 toward the output unit 510 and the second diffraction module 320 changes the optical path of the first image IMG1 and the optical path of the third image IMG3 toward the output unit 510.

A refractive index of the second diffraction module 320 may be substantially the same as a refractive index of the base 301.

The third diffraction module 330 may be disposed on one surface 301a of the base 301 to correspond to the third display panel 130. The third diffraction module 330 may change the optical path of the third image IMG3 of the third display panel 130 toward the second diffraction module 320. The third diffraction module 330 may include diffraction gratings arranged at a third pitch. In such an embodiment, the third pitch of the third diffraction module 330 may be different from the first pitch of the first diffraction module 310 and the second pitch of the second diffraction module 320. In one embodiment, for example, the diffraction gratings of the third diffraction module 330 are arranged at the third pitch corresponding to a light wavelength of the third image IMG3, such that the third diffraction module 330 changes the optical path of the third image IMG3 toward the second diffraction module 320.

In one alternative embodiment, for example, the third diffraction module 330 may include diffraction gratings arranged at a third pitch and having a third depth. In such an embodiment, the third depth of the third diffraction module 330 may be different from the first depth of the first diffraction module 310 and the second depth of the second diffraction module 320. The diffraction gratings of the third diffraction module 330 have the third depth and are arranged at the third pitch corresponding to the light wavelength of the third image IMG3, such that the third diffraction module 330 changes the optical path of the third image IMG3 toward the second diffraction module 320.

A refractive index of the third diffraction module 330 may be substantially the same as the refractive index of the base 301.

The output unit 510 may be disposed on the opposing surface 301b of the base 301 to correspond to the second diffraction module 320. The composite image CI may include the light of the first image IMG1 and the light of the third image IMG3 whose optical paths are changed by the second diffraction module 320, and the light of the second image IMG2 passed through the second diffraction module 320. Therefore, the display device 10 may display the composite image CI having the same resolution as the resolutions of the first to third display panels 110 to 130. A thickness of the display device 10 may be reduced by combining the first to third images IMG1 to IMG3 through the optical path controller 300 without directly stacking the first to third display panels 110 to 130 one on another in a thickness direction thereof.

Figure 6:
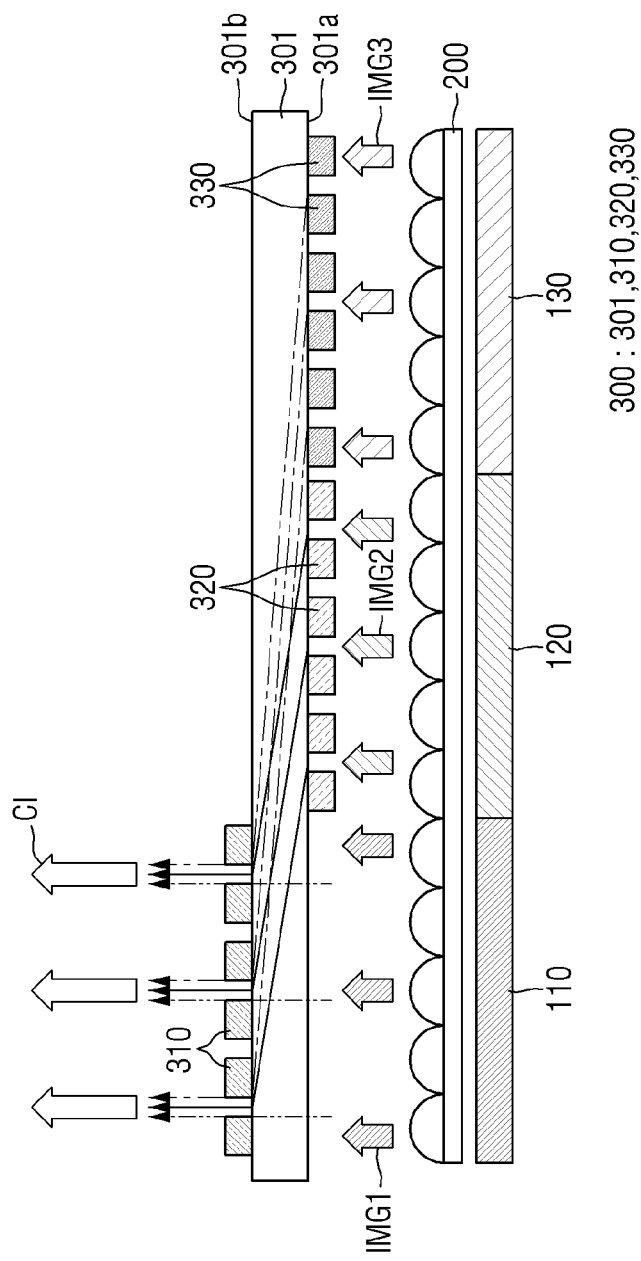
FIG. 6 shows a process of generating a composite image in a display device according to another alternative embodiment.

FIG. 6 shows a process of generating a composite image in a display device according to another alternative embodiment. The display device of FIG. 6 is substantially the same as the display devices of FIGS. 4 and 5 except for the optical path controller 300. The same or like elements shown in FIG. 6 have been labeled with the same reference characters as used above to describe the embodiment of the display device described above, and any repetitive detailed description thereof will hereinafter be omitted or simplified.

Referring to FIG. 6, in an embodiment, the optical path controller 300 may be disposed to face the lens unit 200 and may generate a composite image CI by superimposing images of the first to third display panels 110 to 130 with each other. The optical path controller 300 may include a base 301, a first diffraction module 310, a second diffraction module 320, and a third diffraction module 330.

The first diffraction module 310 may be disposed on the opposing surface 301b of the base 301 to correspond to the first display panel 110. The first diffraction module 310 may transmit light of a first image IMG1 of the first display panel 110 toward the output unit 510. The first diffraction module 310 may include diffraction gratings arranged at a first pitch. The diffraction gratings of the first diffraction module 310 are arranged at the first pitch that does not affect a light wavelength of the first image IMG1, such that the light of the first image IMG1 is transmitted through the first diffraction module 310 toward the output unit 510.

The first diffraction module 310 may change an optical path of light incident from the second diffraction module 320 toward the output unit 510. The first diffraction module 310 may change an optical path of light incident from the third diffraction module 330 toward the output unit 510. The diffraction gratings of the first diffraction module 310 may change the optical path of the second image IMG2 and the optical path of the third image IMG3 toward the output unit 510.

In one alternative embodiment, for example, the first diffraction module 310 may include diffraction gratings arranged at the first pitch and having a first depth. The diffraction gratings of the first diffraction module 310 have the first depth and are arranged at the first pitch that does not affect the light wavelength of the first image IMG1, such that the light of the first image IMG1 is transmitted through the first diffraction module 310 toward the output unit 510.

The second diffraction module 320 may be arranged on one surface 301a of the base 301 to correspond to the second display panel 120. The second diffraction module 320 may change the optical path of the second image IMG2 of the second display panel 120 toward the first diffraction module 310. The second diffraction module 320 may include diffraction gratings arranged at a second pitch. Here, the second pitch of the second diffraction module 320 may be different from the first pitch of the first diffraction module 310. In one embodiment, for example, the diffraction gratings of the second diffraction module 320 are arranged at the second pitch corresponding to a light wavelength of the second image IMG2, such that the second diffraction module 320 changes the optical path of the second image IMG2 toward the first diffraction module 310.

The second diffraction module 320 may include diffraction gratings arranged at the second pitch and having a second depth. In such an embodiment, the second depth of the second diffraction module 320 may be different from the first depth of the first diffraction module 310. The diffraction gratings of the second diffraction module 320 have the second depth and are arranged at the second pitch corresponding to the light wavelength of the second image IMG2, such that the second diffraction module 320 changes the optical path of the second image IMG2 toward the first diffraction module 310.

A refractive index of the second diffraction module 320 may be substantially the same as a refractive index of the base 301.

The third diffraction module 330 may be disposed on one surface 301a of the base 301 to correspond to the third display panel 130. The third diffraction module 330 may change the optical path of the third image IMG3 of the third display panel 130 toward the first diffraction module 310. The third diffraction module 330 may include diffraction gratings arranged at a third pitch. In such an embodiment, the third pitch of the third diffraction module 330 may be different from the first pitch of the first diffraction module 310 and the second pitch of the second diffraction module 320. In one embodiment, for example, the diffraction gratings of the third diffraction module 330 are arranged at the third pitch corresponding to a light wavelength of the third image IMG3, such that the third diffraction module 330 changes the optical path of the third image IMG3 toward the first diffraction module 310.

The third diffraction module 330 may include diffraction gratings arranged at the third pitch and having a third depth. In such an embodiment, the third depth of the third diffraction module 330 may be different from the first depth of the first diffraction module 310 and the second depth of the second diffraction module 320. The diffraction gratings of the third diffraction module 330 have the third depth and are arranged at the third pitch corresponding to the light wavelength of the third image IMG3, such that the third diffraction module 320 changes the optical path of the third image IMG3 toward the first diffraction module 310.

A refractive index of the third diffraction module 330 may be substantially the same as the refractive index of the base 301.

The output unit 510 may be disposed on the opposing surface 301b of the base 301 to correspond to the first diffraction module 310. The composite image CI may include the light of the second image IMG2 and the light of the third image IMG3 whose optical paths are changed by the first diffraction module 310, and the light of the first image IMG1 passed through the first diffraction module 310. Therefore, the display device 10 may display the composite image CI having the same resolution as the resolutions of the first to third display panels 110 to 130. A thickness of the display device 10 can be reduced by combining the first to third images IMG1 to IMG3 through the optical path controller 300 without directly stacking the first to third display panels 110 to 130 one on another in a thickness direction thereof.

Figure 7:
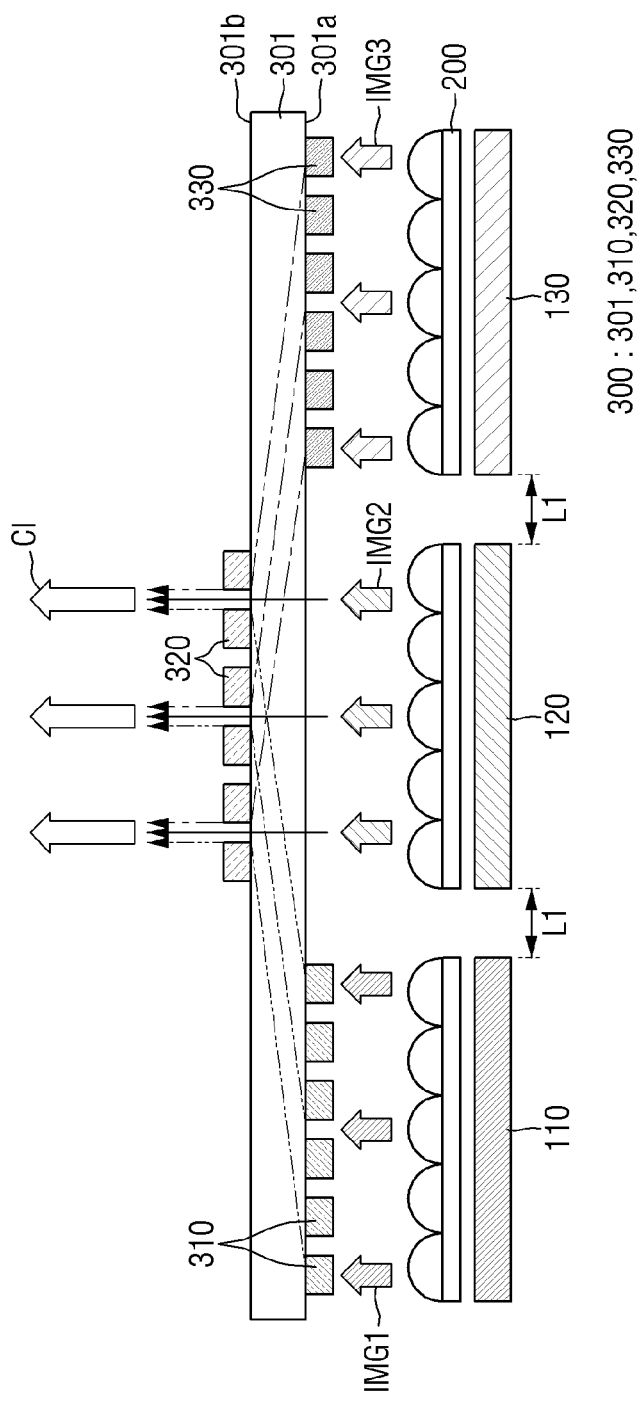
FIG. 7 shows a process of generating a composite image in a display device according to still another alternative embodiment.

FIG. 7 shows a process of generating a composite image in a display device according to still another alternative embodiment. The display device of FIG. 7 is substantially the same as the display devices of FIGS. 4 to 6 except for the display unit 100 and the optical path controller 300. The same or like elements shown in FIG. 7 have been labeled with the same reference characters as used above to describe the embodiment of the display device described above, and any repetitive detailed description thereof will hereinafter be omitted or simplified.

The display unit 100 may include first to third display panels 110, 120, and 130.

The first display panel 110 may include a plurality of pixels that emit light of a first color. The pixels of the first display panel 110 may emit the light of the first color to display a first image IMG1 of the first color.

The second display panel 120 may be disposed at one side of the first display panel 110. The second display panel 120 may include a plurality of pixels that emit light of a second color. The second display panel 120 may emit the light of the second color different from the first color of the first display panel 110 to display a second image IMG2 of the second color.

The third display panel 130 may be disposed at one side of the second display panel 120. The third display panel 130 may include a plurality of pixels that emit light of a third color. The third display panel 130 may emit the light of the third color different from the first color of the first display panel 110 and the second color of the second display panel 120 to display a third image IMG3 of the third color.

In such an embodiment, as shown in FIG. 7, the first to third display panels 110 to 130 may be spaced apart from each other. The first display panel 110 and the second display panel 120 may be spaced apart from each other by a first distance L1, and the second display panel 120 and the third display panel 130 may be spaced apart from each other by the first distance L1.

The optical path controller 300 may be disposed to face the lens unit 200 and may generate a composite image CI by superimposing the images of the first to third display panels 110 to 130 with each other. The optical path controller 300 may include a base 301, a first diffraction module 310, a second diffraction module 320, and a third diffraction module 330.

A first diffraction module 310 may be disposed on one surface 301a of a base 301 to correspond to the first display panel 110. The first diffraction module 310 may change an optical path of a first image IMG1 of the first display panel 110 toward a second diffraction module 320. The first diffraction module 310 may include diffraction gratings arranged at a first pitch. In one embodiment, for example, the diffraction gratings of the first diffraction module 310 are arranged at the first pitch corresponding to a light wavelength of the first image IMG1, such that the first diffraction module 310 changes the optical path of the first image IMG1 toward the second diffraction module 320.

In one alternative embodiment, for example, the first diffraction module 310 may include diffraction gratings arranged at the first pitch and having a first depth. Diffraction gratings of the first diffraction module 310 have a first depth and are arranged at a first pitch corresponding to a light wavelength of the first image IMG1, such that the first diffraction module 310 changes the optical path of the first image IMG1 toward the second diffraction module 320.

A refractive index of the first diffraction module 310 may be substantially the same as a refractive index of the base 301.

The second diffraction module 320 may be disposed on the opposing surface 301b of the base 301 to correspond to a second display panel 120. The second diffraction module 320 may transmit light of a second image IMG2 of the second display panel 120 toward an output unit 510. The second diffraction module 320 may include diffraction gratings arranged at a second pitch. In such an embodiment, the second pitch of the second diffraction module 320 may be different from the first pitch of the first diffraction module 310. In one embodiment, for example, the diffraction gratings of the second diffraction module 320 are arranged at the second pitch that does not affect a light wavelength of the second image IMG2, such that the second image IMG2 may be transmitted through the second diffraction module 320 and proceed to the output unit 510.

The second diffraction module 320 may change the optical path of the light incident from the first diffraction module 310 toward the output unit 510. The second diffraction module 320 may change an optical path of light incident from a third diffraction module 330 toward the output unit 510.

In one alternative embodiment, for example, the second diffraction module 320 may include diffraction gratings arranged at a second pitch and having a second depth. In such an embodiment, the second depth of the second diffraction module 320 may be different from the first depth of the first diffraction module 310. The diffraction gratings of the second diffraction module 320 have a second depth and are arranged at the second pitch that does not affect a light wavelength of the second image IMG2, such that the second diffraction module 320 transmits the light of the second image IMG2 therethrough toward the output unit 510 and changes the optical path of the first image IMG1 and the optical path of the third image IMG3 toward the output unit 510.

A refractive index of the second diffraction module 320 may be substantially the same as a refractive index of the base 301.

A third diffraction module 330 may be disposed on the one surface 301a of the base 301 to correspond to a third display panel 130. The third diffraction module 330 may change the optical path of the third image IMG3 of the third display panel 130 toward the second diffraction module 320. The third diffraction module 330 may include diffraction gratings arranged at a third pitch. In such an embodiment, the third pitch of the third diffraction module 330 may be different from the first pitch of the first diffraction module 310 and the second pitch of the second diffraction module 320. In one embodiment, for example, the diffraction gratings of the third diffraction module 330 are arranged at the third pitch corresponding to a light wavelength of the third image IMG3, such that the third diffraction module 330 changes the optical path of the third image IMG3 toward the second diffraction module 320.

In one alternative embodiment, for example, the third diffraction module 330 may include diffraction gratings arranged at a third pitch and having a third depth. In such an embodiment, the third depth of the third diffraction module 330 may be different from the first depth of the first diffraction module 310 and the second depth of the second diffraction module 320. The diffraction gratings of the third diffraction module 330 have the third depth and are arranged at the third pitch corresponding to the light wavelength of the third image IMG3, such that the third diffraction module 330 changes the optical path of the third image IMG3 toward the second diffraction module 320.

A refractive index of the third diffraction module 330 may be substantially the same as the refractive index of the base 301.

The output unit 510 may be disposed on the opposing surface 301b of the base 301 to correspond to the second diffraction module 320. The composite image CI may include the light of the first image IMG1 and the light of the third image IMG3 whose optical paths are changed by the second diffraction module 320, and the light of the second image IMG2 passed through the second diffraction module 320. In such an embodiment, even when the first to third display panels 110, 120, and 130 are spaced apart by a predetermined distance, the display device 10 may display the composite image CI having the same resolution as the resolutions of the first to third display panels 110 to 130. A thickness of the display device 10 may be reduced by combining the first to third images IMG1 to IMG3 through the optical path controller 300 without directly stacking the first to third display panels 110 to 130 one on another in a thickness direction thereof.

Figure 8:
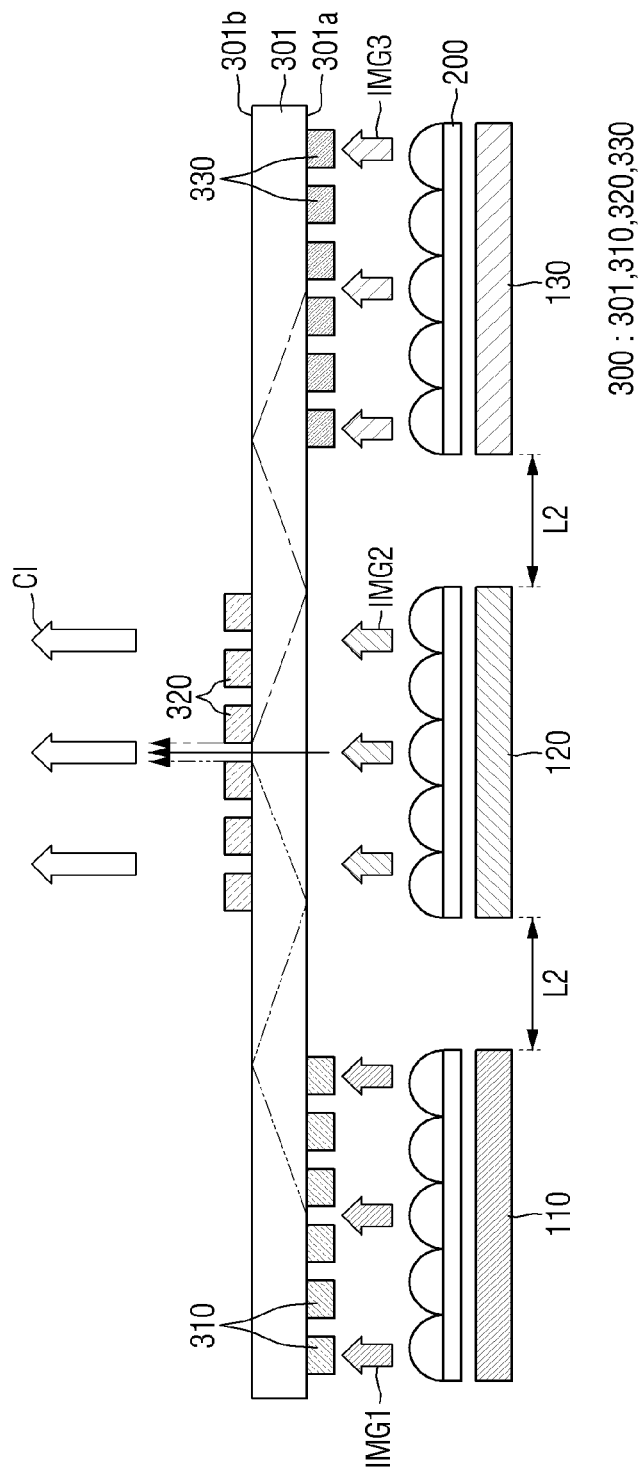
FIG. 8 shows a process of generating a composite image in a display device according to still another alternative embodiment.

FIG. 8 shows a process of generating a composite image in a display device according to still another alternative embodiment. The display device of FIG. 8 is substantially the same as the display devices of FIGS. 4 to 7 except for the display unit 100 and the optical path controller 300. The same or like elements shown in FIG. 8 have been labeled with the same reference characters as used above to describe the embodiment of the display device described above, and any repetitive detailed description thereof will hereinafter be omitted or simplified.

Referring to FIG. 8, in an embodiment, the display unit 100 may include first to third display panels 110, 120, and 130. In such an embodiment, the first to third display panels 110 to 130 may be spaced apart from each other. The first display panel 110 and the second display panel 120 may be spaced apart from each other by a second distance L2, and the second display panel 120 and the third display panel 130 may be spaced apart from each other by the second distance L2. In such an embodiment, the second distance L2 between the first to third display panels 110 to 130 shown in FIG. 8 may be greater than the first distance L1 between the first to third display panels 110 to 130 shown in FIG. 7.

The optical path controller 300 may be disposed to face the lens unit 200 and may generate a composite image CI by superimposing the images of the first to third display panels 110 to 130 with each other. The optical path controller 300 may include a base 301, a first diffraction module 310, a second diffraction module 320, and a third diffraction module 330. In such an embodiment, the optical path of the first image IMG1 changed by the first diffraction module 310 is guided by the base 301 toward the second diffraction module 320, and the optical path of the third image IMG3 changed by the third diffraction module 330 is guided by the base 301 toward the second diffraction module 320.

Figure 9:
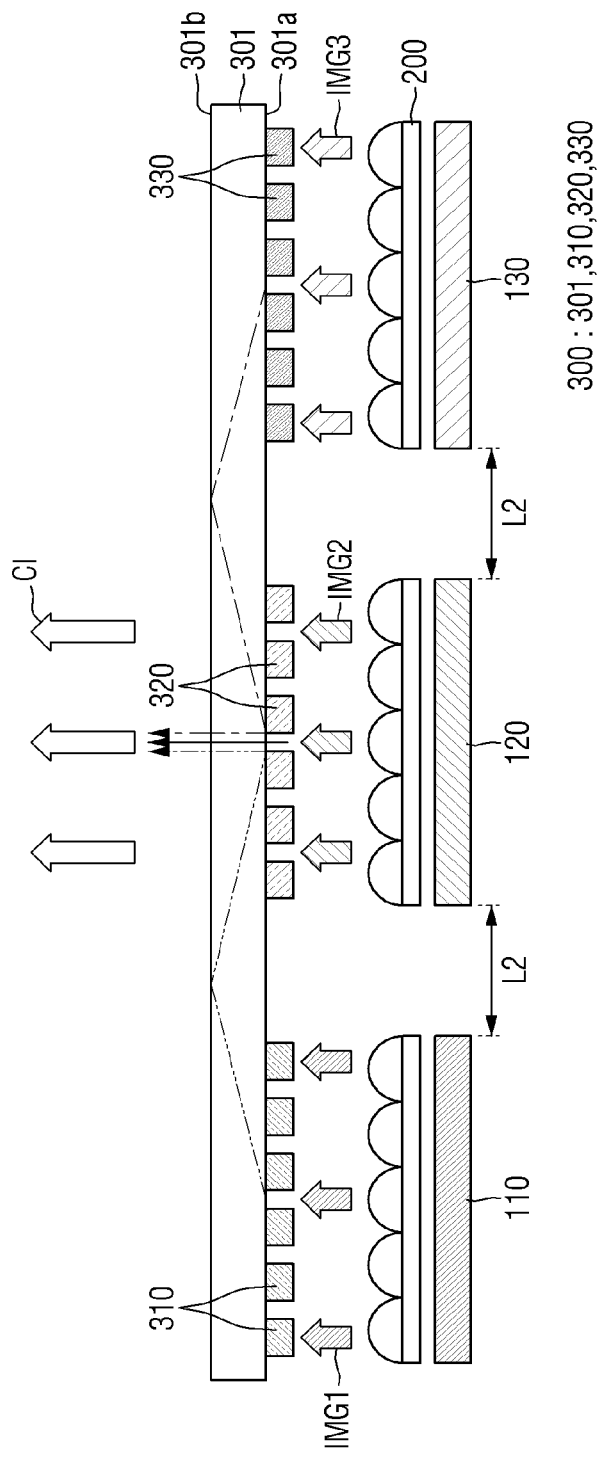
FIG. 9 shows a process of generating a composite image in a display device according to still another alternative embodiment.

FIG. 9 shows a process of generating a composite image in a display device according to still another alternative embodiment. The display device of FIG. 9 is substantially the same as the display device of FIG. 8 except for the optical path controller 300. The same or like elements shown in FIG. 9 have been labeled with the same reference characters as used above to describe the embodiment of the display device described above, and any repetitive detailed description thereof will hereinafter be omitted or simplified.

Referring to FIG. 9, in an embodiment, the optical path controller 300 may be disposed to face the lens unit 200 and may generate a composite image CI by superimposing images of the first to third display panels 110 to 130 with each other. The optical path controller 300 may include a base 301, a first diffraction module 310, a second diffraction module 320, and a third diffraction module 330.

A first diffraction module 310 may be disposed on one surface 301a of a base 301 to correspond to a first display panel 110. The first diffraction module 310 may change an optical path of a first image IMG1 of the first display panel 110 toward the opposing surface 301b of the base 301. The light of the first image IMG1 may be totally reflected inside the base 301 and guided to a second diffraction module 320. In one embodiment, for example, diffraction gratings of the first diffraction module 310 are arranged at a first pitch corresponding to a light wavelength of the first image IMG1, so that the light of the first image IMG1 may be totally reflected inside the base 301 and guided to the second diffraction module 320.

The diffraction gratings of the first diffraction module 310 have a first depth and are arranged at the first pitch corresponding to the light wavelength of the first image IMG1, so that the light of the first image IMG1 may be totally reflected inside the base 301 and guided to the second diffraction module 320.

The second diffraction module 320 may be disposed on one surface 301a of the base 301 to correspond to the second display panel 120. The second diffraction module 320 may transmit light of a second image IMG2 of the second display panel 120 toward an output unit 510.

The second diffraction module 320 may reflect the light of the first image IMG1, which is totally internally reflected and incident, toward the output unit 510. The second diffraction module 320 may reflect light of a third image IMG3, which is totally internally reflected and incident, toward the output unit 510. In one embodiment, for example, diffraction gratings of the second diffraction module 320 are arranged at a second pitch that does not affect a light wavelength of the second image IMG2, such that the light of the first image IMG1 and the light of the third image IMG3 are reflected by the second diffraction module 320 toward the output unit 510.

A third diffraction module 330 may be disposed on one surface 301a of the base 301 to correspond to a third display panel 130. The third diffraction module 330 may change an optical path of the third image IMG3 of the third display panel 130 toward the opposing surface 301b of the base 301. The light of the third image IMG3 may be totally reflected inside the base 301 and provided to the second diffraction module 320. In one embodiment, for example, diffraction gratings of the third diffraction module 330 are arranged at a third pitch corresponding to a light wavelength of the third image IMG3, so that the light of the third image IMG3 may be totally reflected inside the base 301 and guided to the second diffraction module 320.

In one alternative embodiment, for example, the diffraction gratings of the third diffraction module 330 have a third depth and are arranged at the third pitch corresponding to the light wavelength of the third image IMG3, so that the light of the third image IMG3 may be totally reflected inside the base 301 and guided to the second diffraction module 320.

Figure 10:
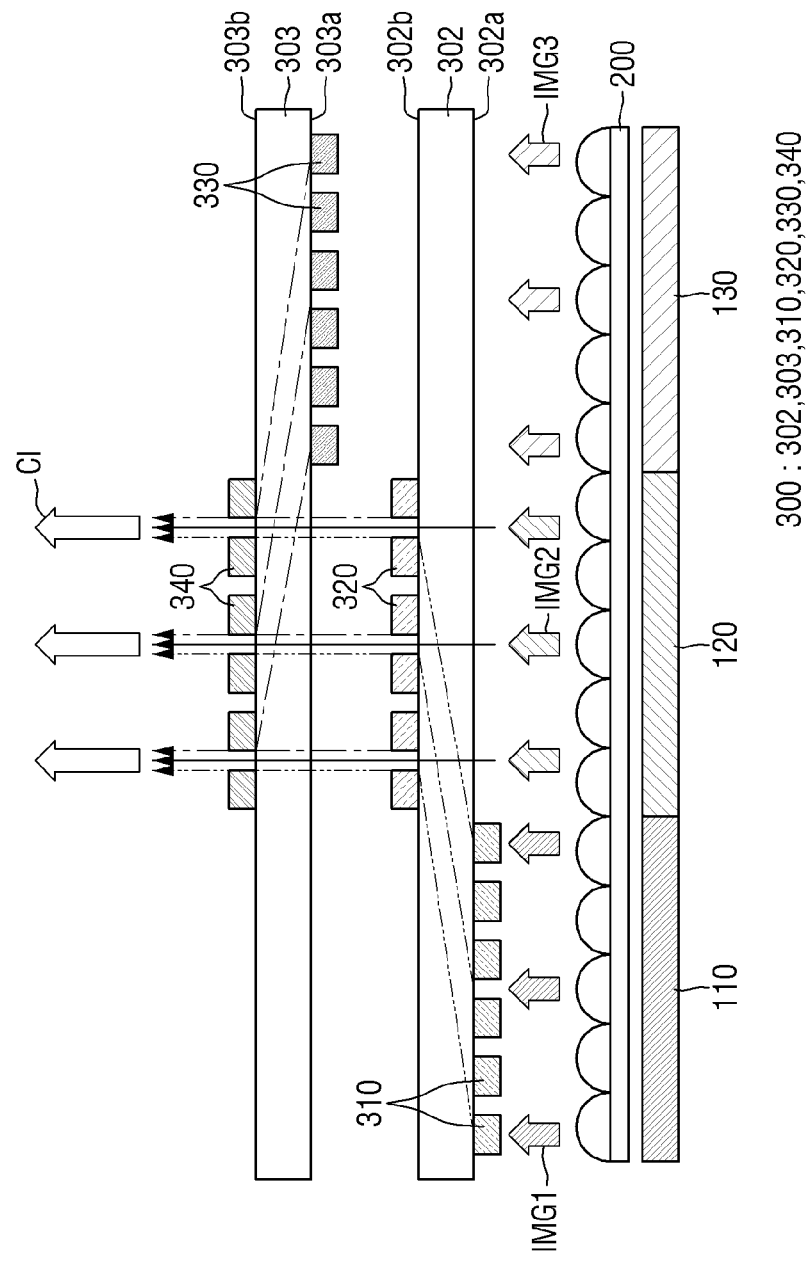
FIG. 10 shows a process of generating a composite image in a display device according to still another alternative embodiment.

FIG. 10 shows a process of generating a composite image in a display device according to still another alternative embodiment. The display device of FIG. 10 is substantially the same as the display devices of FIGS. 4 to 6 except for the optical path controller 300. The same or like elements shown in FIG. 10 have been labeled with the same reference characters as used above to describe the embodiment of the display device described above, and any repetitive detailed description thereof will hereinafter be omitted or simplified.

Referring to FIG. 10, in an embodiment, the optical path controller 300 may be disposed to face the lens unit 200 and may generate a composite image CI by superimposing images of the first to third display panels 110 to 130 with each other. An optical path controller 300 includes a first base 302, a first diffraction module 310, a second diffraction module 320, a second base 303, a third diffraction module 330, and a fourth diffraction module 340.

The first base 302 may directly transmit light incident from a display unit 100. One surface 302a of the first base 302 facing a lens unit 200 and the opposing surface 302b of the first base 302 opposite to the one surface 303a of the second base 303 may be parallel to each other. The direction of the light passing through the one surface 302a of the first base 302 may be the same as the direction of the light passing through the opposing surface 302b of the first base 302. The first base 302 may support the first and second diffraction modules 310 and 320.

The first diffraction module 310 may be disposed on the one surface 302a of the first base 302 to correspond to the first display panel 110. The first diffraction module 310 may change an optical path of the first image IMG1 of the first display panel 110 toward the second diffraction module 320. The first diffraction module 310 may include diffraction gratings arranged at a first pitch. In one embodiment, for example, the diffraction gratings of the first diffraction module 310 are arranged at the first pitch corresponding to a light wavelength of the first image IMG1, such that the first diffraction module 310 changes the optical path of the first image IMG1 toward the second diffraction module 320. In one alternative embodiment, for example, the diffraction gratings of the first diffraction module 310 have a first depth and are arranged at the first pitch corresponding to the light wavelength of the first image IMG1, such that the first diffraction module 310 changes the optical path of the first image IMG1 toward the second diffraction module 320.

The second diffraction module 320 may be disposed on the other surface 302b of the first base 302 to correspond to the second display panel 120. The second diffraction module 320 may transmit light of a second image IMG2 of the second display panel 120 toward the fourth diffraction module 340.

The second diffraction module 320 may change the optical path of the light incident from the first diffraction module 310 toward the fourth diffraction module 340. In one embodiment, for example, diffraction gratings of the second diffraction module 320 are arranged at a second pitch that does not affect a light wavelength of the second image IMG2, such that the second diffraction module 320 changes the optical path of the first image IMG1 toward the fourth diffraction module 340.

The second base 303 may directly transmit the light incident from the first base 302. One surface 303a of the second base 303 facing the opposing surface 302b of the first base 302 and an opposing surface 303b of the second base 303 facing the output unit 510 may be parallel to each other. The direction of the light passing through the one surface 303a of the second base 303 may be the same as the direction of the light passing through the opposing surface 303b of the second base 303. The second base 303 may support the third and fourth diffraction modules 330 and 340.

The third diffraction module 330 may be disposed on the one surface 303a of the second base 303 to correspond to the third display panel 130. The third diffraction module 330 may change an optical path of light of a third image IMG3 of the third display panel 130 toward the fourth diffraction module 340.

The fourth diffraction module 340 may be disposed on the opposing surface 303b of the second base 303 to correspond to the second diffraction module 320. The fourth diffraction module 340 may transmit the light of the first image IMG1 and the light of the second image IMG2 provided from the second diffraction module 320 to the output unit 510. In one embodiment, for example, diffraction gratings of the fourth diffraction module 340 are arranged at a fourth pitch that does not affect the light wavelength of the first image IMG1 and the light wavelength of the second image IMG2, such that the fourth diffraction module transmits the light of the first image IMG1 and the light of the second image IMG2 toward the output unit 510. In such an embodiment, the fourth pitch of the fourth diffraction module 340 may be different from the first to third pitches of the first to third diffraction modules 310 to 330.

The fourth diffraction module 340 may change the optical path of the light incident from the third diffraction module 330 toward the output unit 510. In one embodiment, for example, the diffraction gratings of the fourth diffraction module 340 are arranged at the fourth pitch that does not affect the light wavelength of the first image IMG1 and the light wavelength of the second image IMG2, such that the fourth diffraction module 340 changes the optical path of the third image IMG3 toward the output unit 510.

The output unit 510 may be disposed on the opposing surface 303b of the second base 303 to correspond to the fourth diffraction module 340. The composite image CI may include the light of the first image IMG1 and the light of the second image IMG2 that have passed through the fourth diffraction module 340, and the light of the third image IMG3 whose optical path is changed by the fourth diffraction module 340. Therefore, the display device 10 may display the composite image CI having a same resolution as the resolutions of the first to third display panels 110 to 130. A thickness of the display device 10 may be reduced by combining the first to third images IMG1 to IMG3 through the optical path controller 300 without directly stacking the first to third display panels 110 to 130 one on another in a thickness direction thereof.

Figure 11:
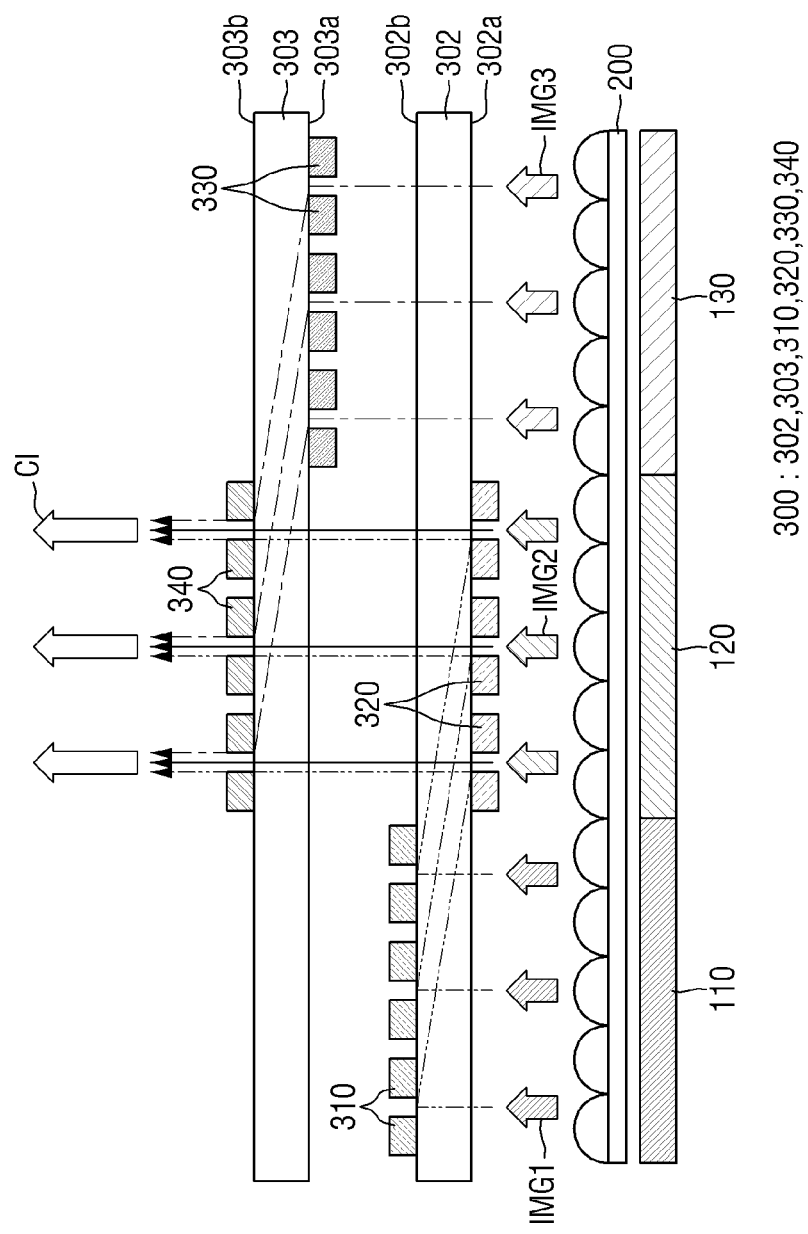
FIG. 11 shows a process of generating a composite image in a display device according to still another alternative embodiment.

FIG. 11 shows a process of generating a composite image in a display device according to still another alternative embodiment. The display device of FIG. 11 is substantially the same as the display device of FIG. 10 except for the optical path controller 300. The same or like elements shown in FIG. 11 have been labeled with the same reference characters as used above to describe the embodiment of the display device described above, and any repetitive detailed description thereof will hereinafter be omitted or simplified.

Referring to FIG. 11, in an embodiment, the optical path controller 300 may be disposed to face the lens unit 200 and may generate a composite image CI by superimposing images of the first to third display panels 110 to 130 with each other. An optical path controller 300 includes a first base 302, a first diffraction module 310, a second diffraction module 320, a second base 303, a third diffraction module 330, a third diffraction module 330, and a fourth diffraction module 340.

The first diffraction module 310 may be disposed on the opposing surface 302b of the first base 302 to correspond to the first display panel 110. The first diffraction module 310 may reflect light of the first image IMG1 of the first display panel 110 toward the second diffraction module 320. In one embodiment, for example, the diffraction gratings of the first diffraction module 310 are arranged at the first pitch corresponding to a light wavelength of the first image IMG1, such that the first diffraction module 310 reflects the light of the first image IMG1 toward the second diffraction module 320. In one alternative embodiment, for example, the diffraction gratings of the first diffraction module 310 have a first depth and are arranged at the first pitch corresponding to the light wavelength of the first image IMG1, such that the first diffraction module 310 reflects the light of the first image IMG1 toward the second diffraction module 320.

The second diffraction module 320 may be disposed on the one surface 302a of the first base 302 to correspond to the second display panel 120. The second diffraction module 320 may transmit light of a second image IMG2 of the second display panel 120 toward the fourth diffraction module 340. In one embodiment, for example, the diffraction gratings of the second diffraction module 320 are arranged at the second pitch corresponding to a light wavelength of the second image IMG2, such that the second diffraction module 320 transmits the light of the second image IMG2 toward the fourth diffraction module 340.

The second diffraction module 320 may reflect the light of the light incident from the first diffraction module 310 toward the fourth diffraction module 340.

In one alternative embodiment, for example, the diffraction gratings of the second diffraction module 320 have the second depth and are arranged at the second pitch that does not affect a light wavelength of the second image IMG2, such that the second diffraction module 320 transmits the light of the second image IMG2 toward the fourth diffraction module 340 and reflects the light of the first image IMG1 toward the fourth diffraction module 340.

The third diffraction module 330 may be disposed on the one surface 303a of the second base 303 to correspond to the third display panel 130. The third diffraction module 330 may change an optical path of light of a third image IMG3 of the third display panel 130 toward the fourth diffraction module 340.

The fourth diffraction module 340 may be disposed on the opposing surface 303b of the second base 303 to correspond to the second diffraction module 320. The fourth diffraction module 340 may transmit the light of the first image IMG1 and the light of the second image IMG2 provided from the second diffraction module 320 to the output unit 510. In one embodiment, for example, diffraction gratings of the fourth diffraction module 340 are arranged at a fourth pitch that does not affect the light wavelength of the first image IMG1 and the light wavelength of the second image IMG2, such that the fourth diffraction module 340 transmits the light of the first image IMG1 and the light of the second image IMG2 toward the output unit 510. In such an embodiment, the fourth pitch of the fourth diffraction module 340 may be different from the first to third pitches of the first to third diffraction modules 310 to 330.

The fourth diffraction module 340 may change the optical path of the light incident from the third diffraction module 330 toward the output unit 510. In one embodiment, for example, the diffraction gratings of the fourth diffraction module 340 are arranged at the fourth pitch that does not affect the light wavelength of the first image IMG1 and the light wavelength of the second image IMG2, such that the fourth diffraction module 340 changes the optical path of the third image IMG3 toward the output unit 510.

In one alternative embodiment, for example, the diffraction gratings of the fourth diffraction module 340 have a fourth depth and are arranged at the fourth pitch, such that the fourth diffraction module 340 transmits the light of the first image IMG1 and the light of the second image IMG2 toward the output unit 510 and changes the optical path of the third image IMG3 toward the output unit 510.

Figure 12:
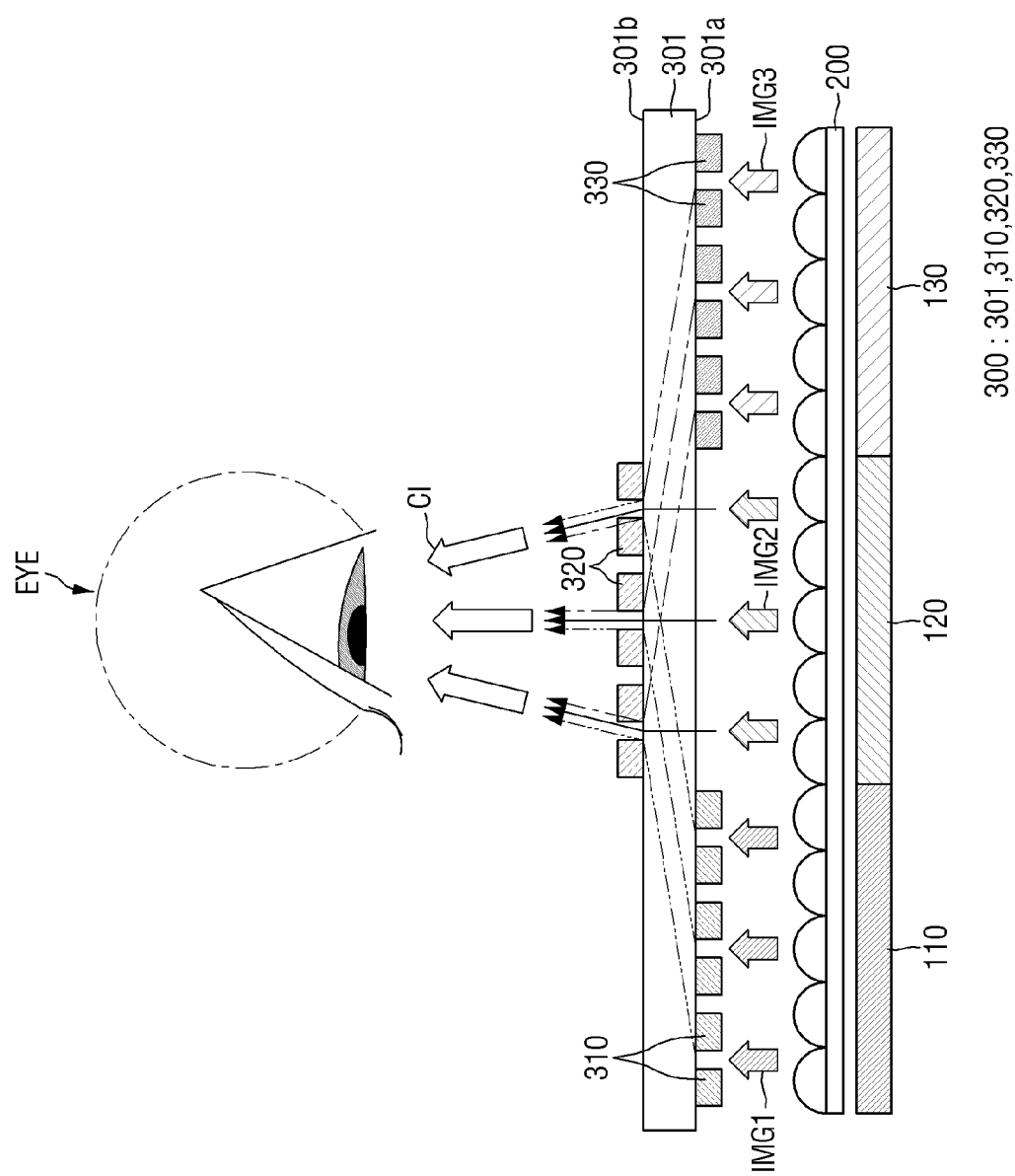
FIG. 12 shows a process of generating a composite image in a display device according to still another alternative embodiment.

FIG. 12 shows a process of generating a composite image in a display device according to still another alternative embodiment. The display device of FIG. 12 is different from the display device of FIG. 5 in the configuration of the second diffraction module 320. The same or like elements shown in FIG. 12 have been labeled with the same reference characters as used above to describe the embodiment of the display device described above, and any repetitive detailed description thereof will hereinafter be omitted or simplified.

Referring to FIG. 12, the optical path controller 300 may include a base 301, a first diffraction module 310, a second diffraction module 320, and a third diffraction module 330.

A first diffraction module 310 may be disposed on one surface 301a of a base 301 to correspond to a first display panel 110. The first diffraction module 310 may change an optical path of a first image IMG1 of the first display panel 110 toward a second diffraction module 320.

The second diffraction module 320 may be disposed on the opposing surface 301b of the base 301 to correspond to a second display panel 120. The second diffraction module 320 may transmit light of a second image IMG2 of the second display panel 120 and allow the light to be focused to a specific point positioned in front of an output unit 510. In one embodiment, for example, diffraction gratings of the second diffraction module 320 are arranged at a second pitch corresponding to a light wavelength of the second image IMG2, such that the second diffraction module 320 transmits and focuses the light of the second image IMG2 to the specific point in front of the output unit 510.

The second diffraction module 320 may change the optical path of the light incident from the first diffraction module 310 to the specific point in front of the output unit 510. The second diffraction module 320 may change an optical path of light incident from a third diffraction module 330 to the specific point in front of the output unit 510. In one embodiment, for example, the diffraction gratings of the second diffraction module 320 are arranged at the second pitch corresponding to the light wavelengths of the first to third images IMG1 to IMG3, such that the second diffraction module 320 focuses the optical path of the first image IMG1 and the optical path of the third image IMG3 to the specific point in front of the output unit 510.

The display device 10 may use an optical path controller 300 to focus the optical paths of the first to third images IMG1 to IMG3 to the specific point in front of the output unit 510. In such an embodiment, the specific point where the optical paths are focused may be a point where user's eyes EYE are located. Therefore, the display device 10 may control a focal point of the composite image CI without a separate optical lens.

Figure 13:
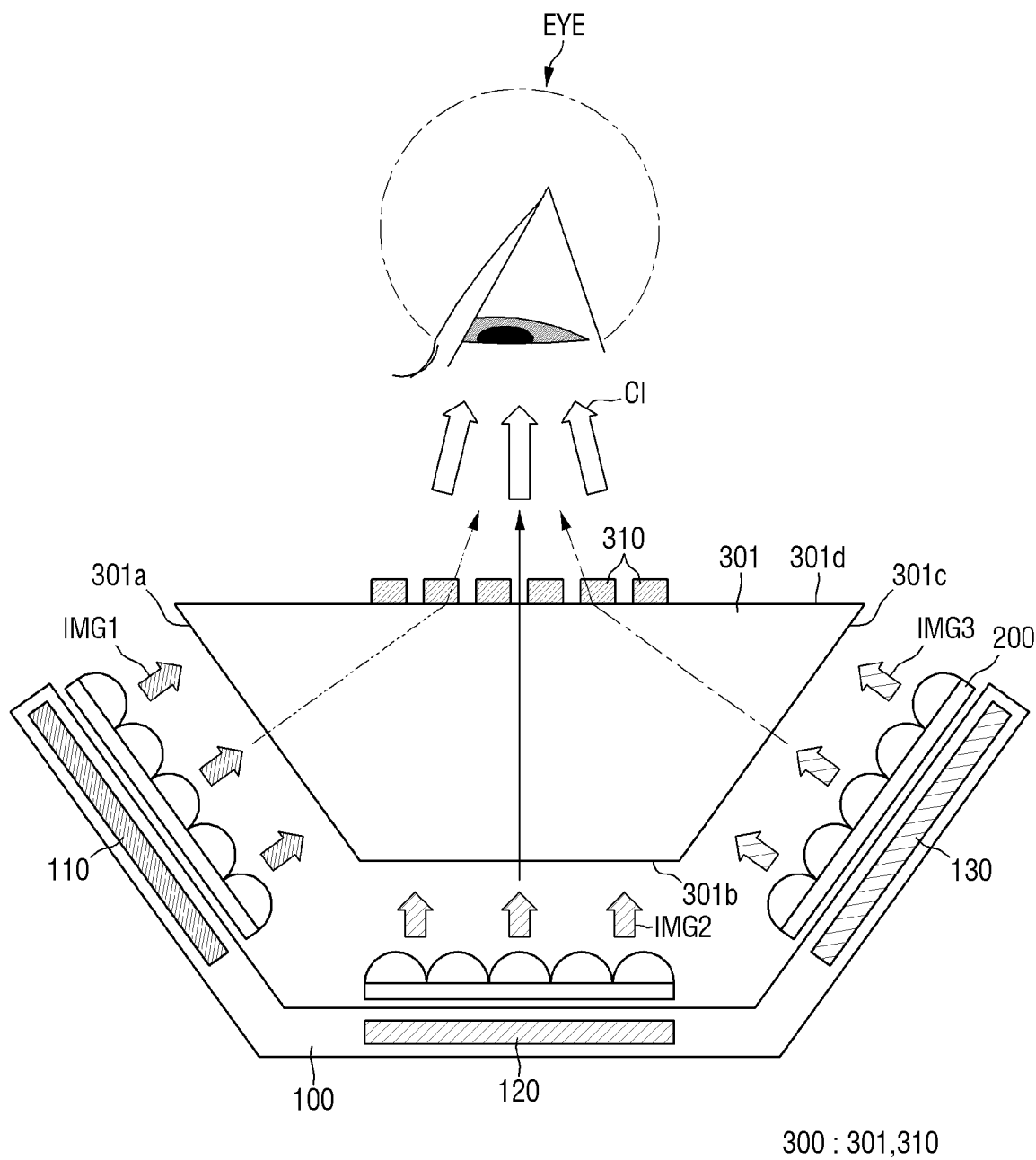
FIG. 13 shows a process of generating a composite image in a display device according to still another alternative embodiment.

FIG. 13 shows a process of generating a composite image in a display device according to still another alternative embodiment.

Referring to FIG. 13, an embodiment of a display unit 100 may include first to third display panels 110, 120, and 130.

The first display panel 110 may be disposed on a first plane and may include a plurality of pixels that emit light of a first color. The pixels of the first display panel 110 may emit the light of the first color to display a first image IMG1 of the first color.

The second display panel 120 may be disposed on a second plane intersecting the first plane and may be disposed at one side of the first display panel 110. Therefore, the first display panel 110 and the second display panel 120 may be misaligned with each other. The second display panel 120 may include a plurality of pixels that emit light of a second color. The second display panel 120 may emit the light of the second color different from the first color of the first display panel 110 to display a second image IMG2 of the second color.

The third display panel 130 may be disposed on a third plane intersecting the first plane and the second plane, and may be disposed at one side of the second display panel 120. Therefore, the first to third display panels 110 to 130 may be misaligned with each other, that is, not on a same plane. The third display panel 130 may include a plurality of pixels that emit light of a third color. The third display panel 130 may emit the light of the third color different from the first color of the first display panel 110 and the second color of the second display panel 120 to display a third image IMG3 of the third color.

The optical path controller 300 may be disposed to face the lens unit 200 and may generate a composite image CI by superimposing the images of the first to third display panels 110 to 130 with each other. An optical path controller 300 may include a base 301 and a first diffraction module 310.

The base 301 may directly transmit light incident from the display unit 100. The base 301 may include first to fourth surfaces 301a, 301b, 301c, and 301d. The first surface 301a of the base 301 may be disposed in parallel with the first display panel 110 or the first plane. The second surface 301b of the base 301 may be disposed in parallel with the second display panel 120 or the second plane. The third surface 301c of the base 301 may be disposed in parallel with the third display panel 130 or the third plane. Therefore, the first to third surfaces 301a to 301c of the base 301 may be misaligned with each other.

The fourth surface 301d of the base 301 may face an output unit 510 and may support the first diffraction module 310.

The first diffraction module 310 may transmit lights of the first to third images IMG1 to IMG3 and allow the lights to be focused to a specific point defined in front of the output unit 510. The light of the first image IMG1 may pass through the first surface 301a of the base 301 and be provided to the first diffraction module 310. The light of the second image IMG2 may pass through the second surface 301b of the base 301 and be provided to the first diffraction module 310. The light of the third image IMG3 may pass through the third surface 301c of the base 301 and be provided to the first diffraction module 310.

In one embodiment, for example, diffraction gratings of the first diffraction module 310 are arranged at a first pitch corresponding to light wavelengths of the first to third images IMG1 to IMG3, so that the lights of the first to third images IMG1 to IMG3 may be transmitted and focused to the specific point disposed in front of the output unit 510.

In one alternative embodiment, for example, the diffraction gratings of the first diffraction module 310 may have a first depth and are arranged at the first pitch corresponding to the light wavelengths of the first to third images IMG1 to IMG3, so that the lights of the first to third images IMG1 to IMG3 may be transmitted and focused on the specific point disposed in front of the output unit 510.

The display device 10 may use the optical path controller 300 to focus the optical paths of the first to third images IMG1 to IMG3 to the specific point in front of the output unit 510. In such an embodiment, the specific point where the optical paths are focused may be a point where user's eyes EYE are located. Therefore, the display device 10 may control a focal point of the composite image CI without a separate optical lens.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:
   a display unit including a plurality of display panels which displays images of different colors;
   a lens unit on the display unit;
   an optical path controller on the lens unit, wherein the optical path controller generates a composite image by superimposing the images displayed by the plurality of display panels with each other; and
   an output unit through which the composite image is displayed,
   wherein the optical path controller controls optical paths of light incident on a first side of a first surface of the optical path controller facing the lens unit and light incident on a second side of the first surface of the optical path controller, and provides the composite image to the output unit.

2. The display device of claim 1, wherein the display unit comprises:
 a first display panel which displays a first image of a first color;
 a second display panel at one side of the first display panel, wherein the second display panel displays a second image of a second color different from the first color; and
 a third display panel at one side of the second display panel, wherein the third display panel displays a third image of a third color different from the first color and the second color.

3. The display device of claim 2, wherein the optical path controller comprises:
 a base which transmits lights of the first to third images;
 a first diffraction module on a second surface of the base, wherein the first diffraction module reflects light of the first image;
 a second diffraction module on a first surface of the base opposite to the second surface, wherein the second diffraction module reflects light of each of the first image and the third image toward the output unit and transmits light of the second image; and
 a third diffraction module on the second surface of the base, wherein the third diffraction module reflects the light of the third image toward the second diffraction module.

4. The display device of claim 3, wherein
 each of the first to third diffraction modules includes diffraction gratings having a predetermined pitch, and
 pitches of the diffraction gratings of the first to third diffraction modules are different from each other.

5. The display device of claim 3, wherein
 the first diffraction module includes diffraction gratings arranged at a first pitch, and reflects the light of the first image toward the second diffraction module,
 the second diffraction module includes diffraction gratings arranged at a second pitch different from the first pitch, reflects the light of each of the first image and the third image toward the output unit, and transmits the light of the second image, and
 the third diffraction module includes diffraction gratings arranged at a third pitch different from the first pitch and the second pitch, and reflects the light of the third image toward the second diffraction module.

6. The display device of claim 2, wherein the optical path controller comprises:
 a base which transmits lights of the first to third images;
 a first diffraction module on a first surface of the base, wherein the first diffraction module changes an optical path of light of the first image;
 a second diffraction module on a second surface of the base, which is opposite to the first surface, wherein the second diffraction module changes an optical path of light of each of the first and third images toward the output unit and transmits light of the second image; and
 a third diffraction module on the first surface of the base, wherein the third diffraction module changes the optical path of the light of the third image toward the second diffraction module.

7. The display device of claim 2, wherein the optical path controller comprises:
 a base which transmits lights of the first to third images;
 a first diffraction module on a second surface of the base, wherein the first diffraction module transmits light of the first image and changes an optical path of light of each of the second and third images toward the output unit;
 a second diffraction module on a first surface of the base, which is opposite to the second surface, wherein the second diffraction module changes the optical path of the light of the second image toward the first diffraction module; and
 a third diffraction module on the first surface of the base, wherein the third diffraction module changes the optical path of the light of the third image toward the first diffraction module.

8. The display device of claim 2, wherein the optical path controller comprises:
 a first base on the lens unit;
 a first diffraction module on a first surface of the first base to correspond to the first display panel;
 a second diffraction module on a second surface of the first base to correspond to the second display panel;
 a second base on the first base;
 a third diffraction module on a first surface of the second base to correspond to the third display panel; and
 a fourth diffraction module on a second surface of the second base to correspond to the output unit.

9. The display device of claim 8, wherein
 the first diffraction module changes an optical path of light of the first image toward the second diffraction module,
 the second diffraction module changes the optical path of the light of the first image toward the fourth diffraction module, and transmits light of the second image toward the fourth diffraction module,
 the third diffraction module changes an optical path of light of the third image toward the fourth diffraction module, and
 the fourth diffraction module transmits the light of the first image and the light of the second image toward the output unit, and changes the optical path of the light of the third image toward the output unit.

10. The display device of claim 2, wherein the optical path controller comprises:
 a first base on the lens unit;
 a first diffraction module on a second surface of the first base to correspond to the first display panel;
 a second diffraction module on a first surface of the first base to correspond to the second display panel;
 a second base on the first base;
 a third diffraction module on a first surface of the second base to correspond to the third display panel; and
 a fourth diffraction module on a second surface of the second base to correspond to the output unit.

11. The display device of claim 10, wherein
 the first diffraction module reflects light of the first image toward the second diffraction module,
 the second diffraction module reflects the light of the first image toward the fourth diffraction module, and transmits light of the second image toward the fourth diffraction module,
 the third diffraction module changes an optical path of light of the third image toward the fourth diffraction module, and
 the fourth diffraction module transmits the light of the first image and the light of the second image toward the output unit, and changes the optical path of the light of the third image toward the output unit.

12. The display device of claim 2, wherein the optical path controller comprises:
 a base which transmits lights of the first to third images;

a first diffraction module on a first surface of the base, wherein the first diffraction module changes an optical path of light of the first image;

a second diffraction module on a second surface of the base, which is opposite to the first surface, wherein the second diffraction module changes an optical path of light each of the first and third images and transmits light of the second image; and a third diffraction module on the second surface of the base, wherein the third diffraction module changes an optical path of light of the third image toward the second diffraction module, wherein the second diffraction module focuses the optical paths of the lights of the first to third images to a specific point in front of the output unit.

13. The display device of claim 1, wherein the display unit comprises:

a first display panel which displays a first image of a first color;

a second display panel spaced apart from the first display panel by a predetermined distance, wherein the second display panel displays a second image of a second color different from the first color; and a third display panel spaced apart from the second display panel by a predetermined distance, wherein the third display panel displays a third image of a third color different from the first color and the second color.

14. The display device of claim 13, wherein the optical path controller comprises:

a base which transmits lights of the first to third images;

a first diffraction module on a first surface of the base, wherein the first diffraction module changes an optical path of light of the first image;

a second diffraction module on a second surface of the base, which is opposite to the first surface, wherein the second diffraction module changes an optical path of light of each of the first and third images toward the output unit and transmit the light of the second image; and a third diffraction module on the first surface of the base, wherein the third diffraction module changes the optical path of the light of the third image toward the second diffraction module.

15. The display device of claim 13, wherein the optical path controller comprises:

a base which transmits or totally internally reflects lights of the first to third images;

a first diffraction module on a first surface of the base, wherein the first diffraction module changes an optical path of light of the first image;

a second diffraction module on a second surface of the base, which is opposite to the first surface, wherein the second diffraction module changes an optical path of light of each of the first and third images toward the output unit and transmits the light of the second image; and a third diffraction module on the first surface of the base, wherein the third diffraction module changes the optical path of the light of the third image, wherein the light of the first image passed through the first diffraction module and the light of the third image passed through the third diffraction module are totally reflected inside the base and guided to the second diffraction module.

16. The display device of claim 13, wherein the optical path controller comprises:

a base which transmits or totally internally reflects lights of the first to third images;

a first diffraction module on a first surface of the base, wherein the first diffraction module changes an optical path of light of the first image;

a second diffraction module on the first surface of the base, wherein the second diffraction module reflects light of each of the first image and the third image toward the output unit and transmits light of the second image; and a third diffraction module on the first surface of the base, wherein the third diffraction module changes an optical path of the light of the third image, wherein the light of the first image passed through the first diffraction module and the light of the third image passed through the third diffraction module are totally reflected inside the base and guided to the second diffraction module.

17. The display device of claim 1, wherein the display unit comprises:

a first display panel on a first plane, wherein the first display panel displays a first image of a first color;

a second display panel on a second plane intersecting the first plane, wherein the second display panel displays a second image of a second color different from the first color; and a third display panel on a third plane intersecting the first plane and the second plane, wherein the third display panel displays a third image of a third color different from the first color and the second color.

18. The display device of claim 17, wherein
the optical path controller comprises a base which transmits lights of the first to third images,
wherein the base includes a first surface parallel to the first plane, a second surface parallel to the second plane, a third surface parallel to the third plane, and a fourth surface facing the output unit.

19. The display device of claim 18, wherein
light of the first image passes through the first surface to reach the fourth surface,
light of the second image passes through the second surface to reach the fourth surface, and
light of the third image passes through the third surface to reach the fourth surface.

20. The display device of claim 18, wherein the base further comprises a diffraction module on the fourth surface of the base, wherein the diffraction module focuses optical paths of the lights of the first to third images to a specific point in front of the output unit.

* * * * *